US008625933B2

(12) United States Patent
Nagamasa

(10) Patent No.: US 8,625,933 B2
(45) Date of Patent: Jan. 7, 2014

(54) IMAGE PROCESSING APPARATUS AND METHOD FOR THE SAME

(75) Inventor: Yoshinobu Nagamasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1133 days.

(21) Appl. No.: 12/571,658

(22) Filed: Oct. 1, 2009

(65) Prior Publication Data

US 2010/0085385 A1 Apr. 8, 2010

(30) Foreign Application Priority Data

Oct. 3, 2008 (JP) ................................ 2008-258452

(51) Int. Cl.
*G06K 9/32* (2006.01)

(52) U.S. Cl.
USPC ............................ 382/298; 382/181; 382/291

(58) Field of Classification Search
USPC .................................................. 382/181, 291
See application file for complete search history.

(56) References Cited

U.S. PATENT DOCUMENTS

| | | | | |
|---|---|---|---|---|
| 6,169,966 | B1 * | 1/2001 | Miura et al. | 702/142 |
| 7,113,616 | B2 * | 9/2006 | Ito et al. | 382/103 |
| 7,548,269 | B2 * | 6/2009 | Yata | 348/352 |
| 7,783,184 | B2 * | 8/2010 | Chi | 396/80 |
| 7,899,208 | B2 * | 3/2011 | Kondo et al. | 382/103 |
| 2010/0085385 | A1 * | 4/2010 | Nagamasa | 345/660 |

FOREIGN PATENT DOCUMENTS

| | | | |
|---|---|---|---|
| JP | 2003-235035 | A | 8/2003 |
| JP | 2004-171490 | A | 6/2004 |
| JP | 2005-267512 | A | 9/2005 |
| JP | 2007-025899 | A | 2/2007 |
| JP | 2007-304852 | A | 11/2007 |

* cited by examiner

*Primary Examiner* — Gregory M Desire
(74) *Attorney, Agent, or Firm* — Canon U.S.A., Inc. IP Division

(57) ABSTRACT

An image processing apparatus can detect a predetermined target object from image data. The image processing apparatus includes an image zooming unit configured to generate a plurality of pieces of zoomed image data that are mutually different in magnification from the image data input by an image inputting unit, a detection unit configured to extract a partial area from the plurality of pieces of zoomed image data generated by the image zooming unit, and detect the predetermined target object by performing collation to determine whether the extracted partial area coincides with a detection pattern stored in a detected pattern storage unit, and a detected information storage unit configured to store detection information including magnification information of the zoomed image data from which the predetermined target object is detected by the detection unit. In a case where the detection information is stored in the detected information storage unit, the image zooming unit determines a magnification of the zoomed image data based on the detection information and generates at least one piece of zoomed image data whose total number is smaller compared to a case where the detection information is not stored.

15 Claims, 10 Drawing Sheets

IMAGE PROCESSING APPARATUS AND METHOD FOR THE SAME

BACKGROUND OF THE INVENTION

1. Field of the Invention

The present invention relates to image processing, and more particularly to a technique capable of detecting an imaging object pattern from a moving image.

2. Description of the Related Art

Conventionally, an image processing method which can automatically detect a predetermined imaging object pattern from a moving image has been discussed and the method can be used to determine, for example, a human face or the like. This kind of image processing method can be used in a video conference, a monitoring system, or the like.

Such techniques that can be used to detect a predetermined imaging object pattern from an image are, for example, discussed in Japanese Patent Application Laid-Open No. 2007-25899, Japanese Patent Application Laid-Open No. 2004-171490, and Japanese Patent Application Laid-Open No. 2003-235035 according to which the predetermined imaging object pattern can be detected using a template matching technique.

However, according to the technique discussed in Japanese Patent Application Laid-Open No. 2007-25899, a burden in calculation processing increases if the system generates a plurality of reduced images from an input image on a frame-by-frame basis and performs matching between a predetermined imaging object pattern and the template. Accordingly, unless an employed hardware has high-speed processing capabilities, it will be required to use the method discussed in Japanese Patent Application Laid-Open No. 2004-171490 to perform detection processing according to the template matching at constant frame intervals so that the calculations for processing can be smoothly executed.

In this case, for example, if a zoomed-up image of a predetermined imaging object is captured by a camera, the system may not perform tracking using panning and tilting functions when the predetermined imaging object exits from the frame between non-processed frames.

Further, according to the technique discussed in Japanese Patent Application Laid-Open No. 2004-171490, the system performs normal detection processing at constant frame intervals and inserts a frame that detects only a position adjacent to a coordinate of the already detected imaging object between two frames at which the normal detection processing is performed. This system intends to reduce the burden in calculations for the template matching processing.

However, the imaging object may not be captured in a detection area if a moving speed of the imaging object is inappropriate. The imaging object cannot be detected in this case. Further, in a zoom-up operation of the camera, or in a situation where a distance between the imaging object and the camera becomes shorter, the imaging object may not be detected based on only the detection at or near the coordinate position of the previous detection frame.

Further, according to the technique discussed in Japanese Patent Application Laid-Open No. 2003-235035, the system obtains a difference between an input image and a background image and registers the obtained difference as a template. In this case, a predetermined imaging object in the template is identical to a predetermined imaging object in the original input image.

If the camera performs a zooming control, the system performs conversion in resolution based on the zooming parameter to equalize in size the predetermined imaging object of the input image with the predetermined imaging object of the template, so that the imaging object pattern can be detected.

However, this technique is only effective in an operation for tracking an imaging object that has been captured in the input image and cannot be used in a situation where the distance between the imaging object and the camera is variable. Accordingly, detection accuracy deteriorates when the distance between the imaging object and the camera is changed.

SUMMARY OF THE INVENTION

Exemplary embodiments of the present invention are directed to a technique capable of reducing a burden in calculations for detecting an imaging object pattern and capable of maintaining accuracy in detection of the imaging object pattern.

According to an aspect of the present invention, an image processing apparatus can detect a predetermined target object from image data. The image processing apparatus includes an image inputting unit configured to input the image data, a detected pattern storage unit configured to store a detection pattern representing the predetermined target object, an image zooming unit configured to generate a plurality of pieces of zoomed image data that are mutually different in magnification from the image data input by the image inputting unit, a detection unit configured to extract a partial area from the plurality of pieces of zoomed image data generated by the image zooming unit, and detect the predetermined target object by performing collation to determine whether the extracted partial area coincides with the detection pattern stored in the detected pattern storage unit, and a detected information storage unit configured to store detection information including magnification information of the zoomed image data from which the predetermined target object is detected by the detection unit. In a case where the detection information is stored in the detected information storage unit, the image zooming unit determines a magnification of the zoomed image data based on the detection information and generates at least one piece of zoomed image data whose total number is smaller compared to a case where the detection information is not stored.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
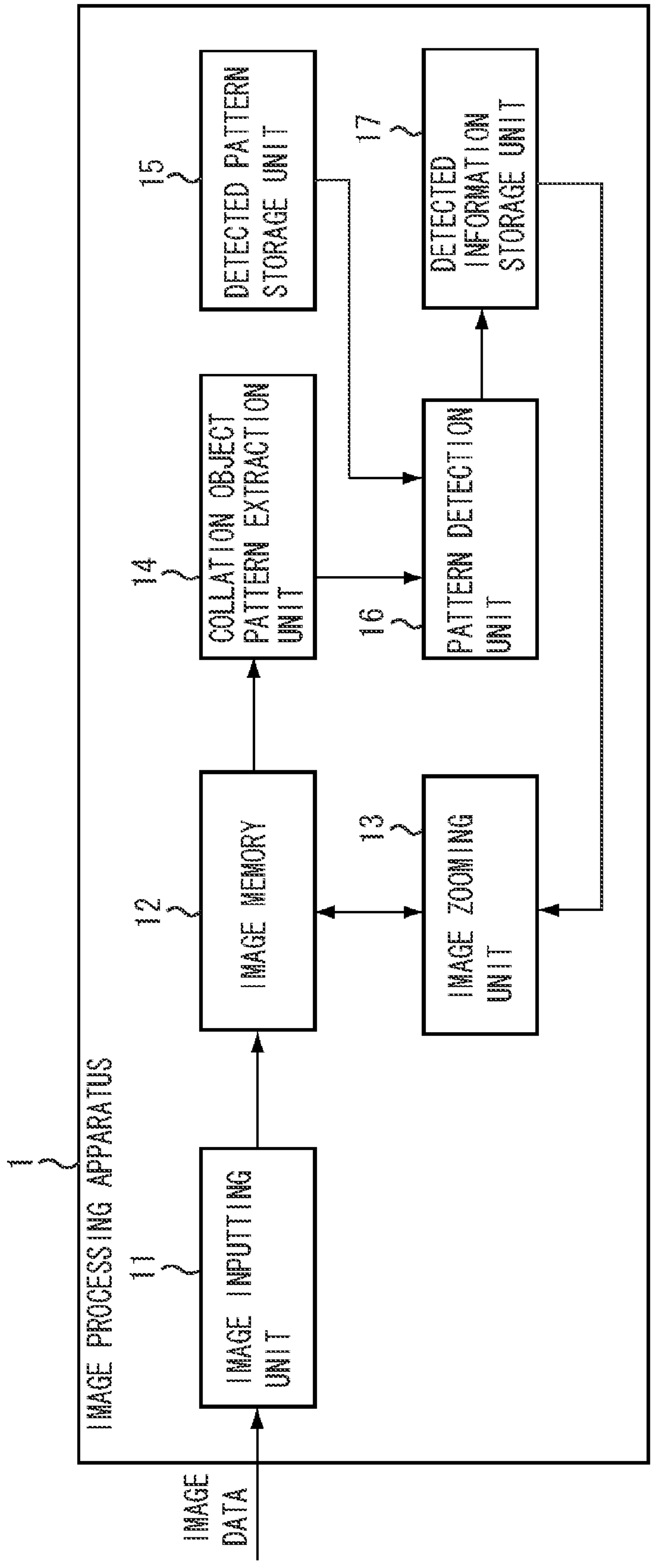
FIG. 1 is a block diagram illustrating an example of the configuration of an image processing apparatus according to a first exemplary embodiment of the present invention.

FIG. 1 is a block diagram illustrating an example of the configuration of an image processing apparatus 1 according to an exemplary embodiment of the present invention. First, the configuration of the image processing apparatus 1 according to the present exemplary embodiment is described below.

In FIG. 1, an image inputting unit 11 receives image data. The image inputting unit 11 has a decoding processing function for receiving image data that may be conformable to a specific communication method and compatible with a marker code-attached protocol or compression processed image data such as Joint Photographic Experts Group (JPEG)/Motion Joint Photographic Experts Group 4 (MPEG4). In the present exemplary embodiment, the image data include photographic image data captured and generated by an imaging apparatus and image data stored in an external storage apparatus. An output source is not limited to a specific device.

An image memory 12 can be configured by a random access memory (RAM) or other readable and writable storage apparatus. The image memory 12 stores the image data received by the image inputting unit 11 and zooming processed image data supplied from an image zooming unit 13. The image zooming unit 13 can read the image data stored in the image memory 12 and generate reduced image data (i.e., zoomed image data). The image zooming unit 13 can write the reduced image data into the image memory 12.

A collation object pattern extraction unit 14 can move a rectangular area which has a predetermined size on the reduced image data stored in the image memory 12 and successively extract and output a portion (i.e., a pixel group) included in the rectangular area as a collation object pattern. In the present exemplary embodiment, an original image can be regarded as an image having a reduced size of 1/1 and can be interpreted as one of the reduced images.

A detected pattern storage unit 15 can store beforehand a detection pattern that represents a predetermined pattern (target object) to be detected from an input image. A pattern detection unit 16 performs collation based on the detection pattern stored in the detected pattern storage unit 15 to determine whether the collation object pattern coincides with the predetermined pattern. A detected information storage unit 17 can receive magnification information relating to a zooming ratio of the reduced image which is used when the predetermined pattern is detected by the pattern detection unit 16. The detected information storage unit 17 stores the magnification information received from the pattern detection unit 16.

Next, an example of processing that can be realized by the functional components illustrated in FIG. 1 is described below with reference to flowcharts illustrated in FIGS. 2A and 2B. The image processing apparatus 1 can provide two types of detection modes (i.e., a normal detection mode and a high-speed detection mode) which can be selected in detection of the predetermined pattern. It is now assumed that the image processing apparatus 1 starts its operation in the normal detection mode.

Figure 2A:
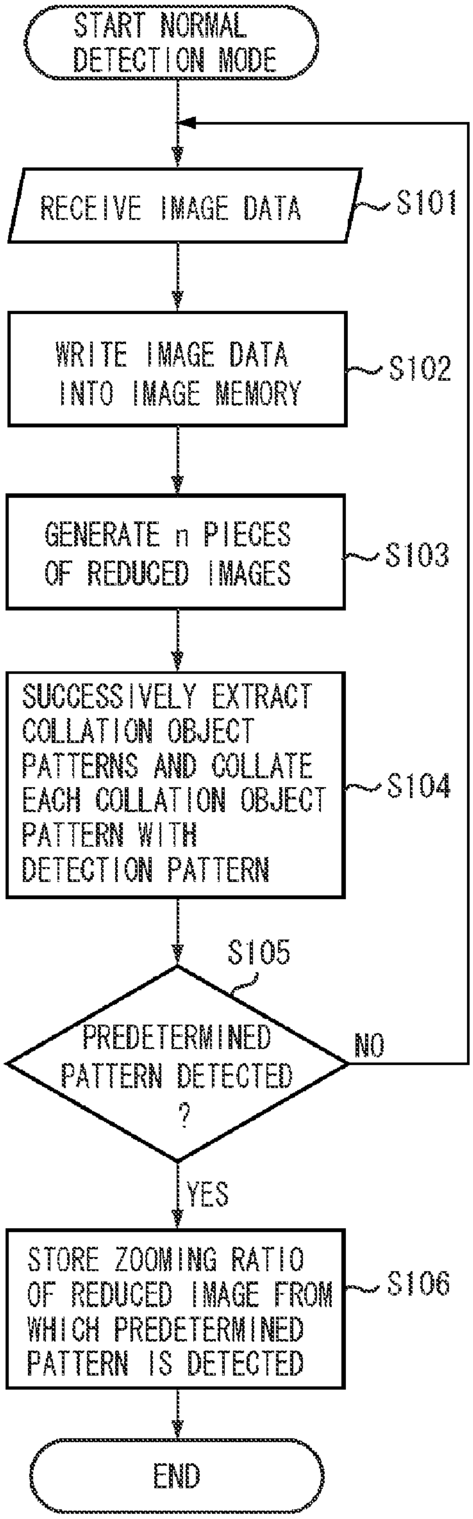
FIGS. 2A and 2B are flowcharts illustrating an example of processing procedure for detecting a predetermined pattern which can be performed by the image processing apparatus according to the first exemplary embodiment.

FIG. 2A is a flowchart illustrating an example of a processing procedure for detecting a predetermined pattern, which can be performed by the image processing apparatus 1 that operates in the normal detection mode according to the present exemplary embodiment.

First, after starting the processing, in step S101, the image inputting unit 11 receives image data. In this case, if the received image data is the image data that may be conformable to the specific communication method and compatible with the marker code-attached protocol or the compression processed image data such as JPEG/MPEG4, the image inputting unit 11 performs decoding processing on the received image data.

Next, in step S102, the image inputting unit 11 writes the processing result as input image data into the image memory 12. When the decoding processing is not required, the image inputting unit 11 directly writes the received image data as input image data into the image memory 12.

Next, in step S103, the image zooming unit 13 reads the input image data stored in the image memory 12 and generates n ($n \geq 2$) pieces of reduced image data. The image zooming unit 13 writes the generated reduced image data into the image memory 12.

For example, it is assumed that the input image is of a Video Graphic Array (VGA) size (640 pixels in the horizontal direction and 480 pixels in the vertical direction). The image zooming unit 13 reduces the input VGA data and generates first reduced image A1 data which has a size of 320 pixels in the horizontal direction and 240 pixels in the vertical direction. The image zooming unit 13 writes the first reduced image A1 data into the image memory 12.

Moreover, the image zooming unit 13 reads the reduced image A1 data from the image memory 12 and generates second reduced image A2 data which has a size comparable to 0.8 times the reduced image A1 data in both the horizontal and vertical directions. The image zooming unit 13 writes the second reduced image A2 data into the image memory 12. The image zooming unit 13 repeats similar reduction processing until n-th reduced image An data can be obtained.

In the present exemplary embodiment, a zooming ratio (i.e., a magnification of an image relative to the input image) in generation of the reduced image data is a mere example.

Further, the value n can be changed considering various conditions, such as the size of the input image or the size of the detection pattern. Alternatively, the value n can be a fixed value. Hereinafter, the zooming ratios for generating the data of the reduced images A1 to An can be referred to as magnifications A1 to An.

Figure 3A:
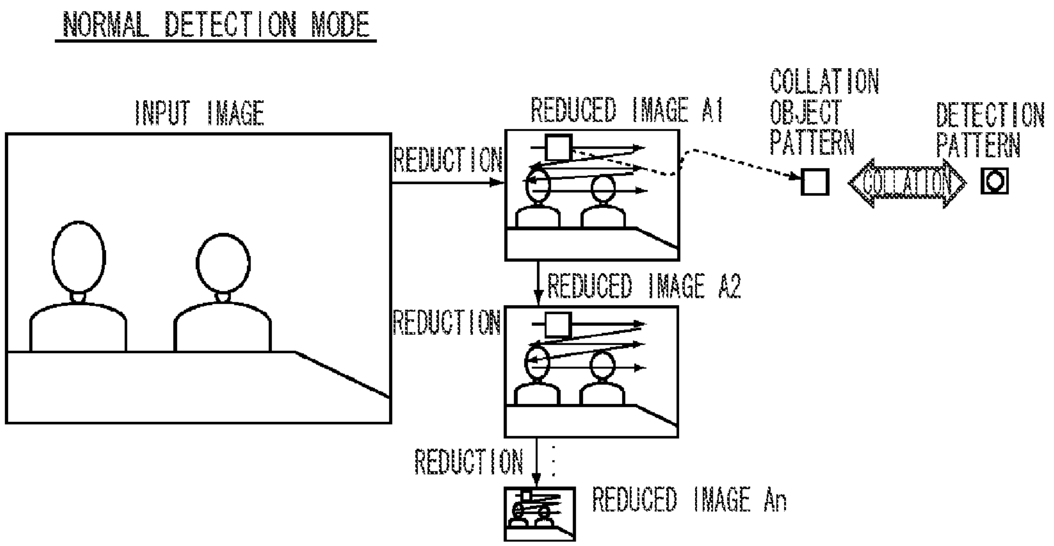
FIGS. 3A and 3B illustrate an example of collating processing to be performed to check whether a collation object pattern coincides with a detection pattern with respect to various reduced images that are different in size according to the first exemplary embodiment.

Next, in step S104, the collation object pattern extraction unit 14 moves a rectangular area having a predetermined size on the data of the reduced images A1 to An in a direction indicated by an arrow, as illustrated in FIG. 3A, and successively extracts a portion (i.e., a pixel group) included in the rectangular area as a collation object pattern. Then, the portions (i.e., pixel groups) extracted by the collation object pattern extraction unit 14 are output to the pattern detection unit 16.

In the present exemplary embodiment, the "predetermined size" can be arbitrarily determined to be a size equal to or greater than the reduced image An, although the rectangular area illustrated in FIG. 3A is similar in size to the detection pattern. The procedure indicated by the arrow is a mere example. The procedure for the successive extraction may be arbitrarily changed.

The pattern detection unit 16 successively performs collation to determine whether each collation object pattern extracted by the collation object pattern extraction unit 14 coincides with the predetermined pattern, referring to the detection pattern stored in the detected pattern storage unit 15. As described above, in the normal detection mode, the image processing apparatus 1 can generate a total of n pieces of reduced image data and perform collation on the generated n pieces of reduced image data.

Next, in step S105, it is determined whether the predetermined pattern has been detected referring to a result of the collation performed on the reduced images A1 to An. If it is determined that the predetermined pattern has not been detected (NO in step S105), the processing returns to step S101 to repeat the processing of steps S101 to S104. On the other hand, if it is determined that the predetermined pattern has been detected (YES in step S105), the processing proceeds to step S106.

For example, it is assumed that in step S105 the pattern detection unit 16 has detected the predetermined pattern from the reduced image A6 (i.e., the sixth reduced image). In this case, in step S106, the detected information storage unit 17 receives information indicating a magnification A6 of the reduced image A6, which is a zooming ratio relative to the input image, from the pattern detection unit 16. The detected information storage unit 17 stores the received zooming ratio information. Then, after the zooming ratio information is stored in the detected information storage unit 17, the image processing apparatus 1 terminates the operation in the normal detection mode and shifts its operation mode to the high-speed detection mode.

Figure 2B:
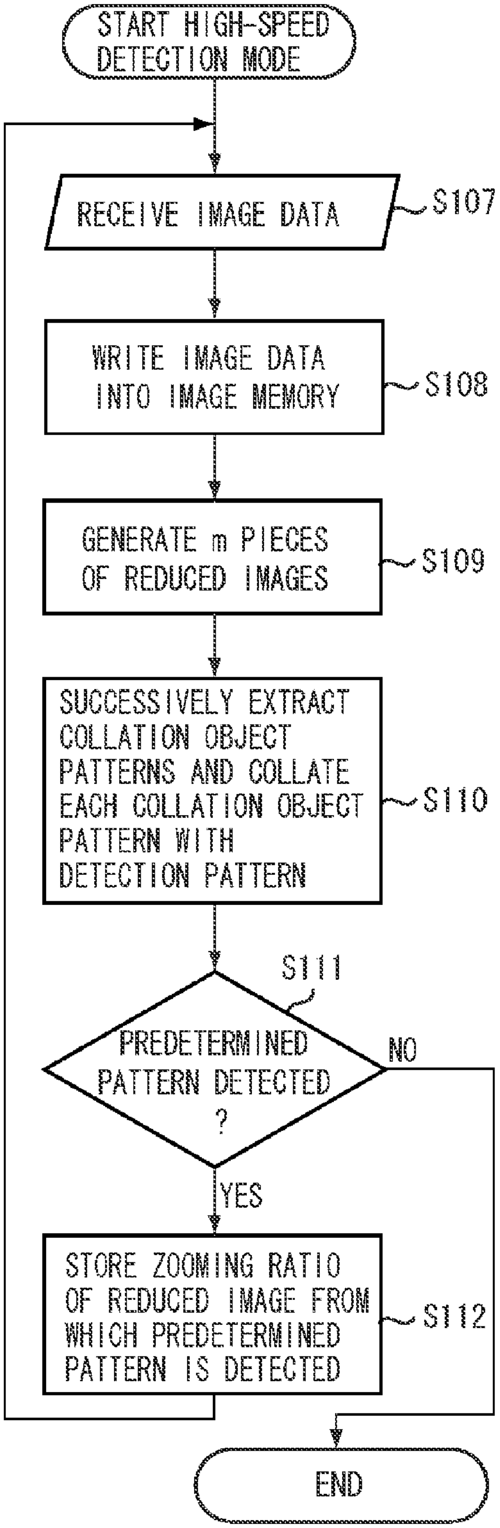

FIG. 2B is a flowchart illustrating an example of a processing procedure for detecting a predetermined pattern, which can be performed by the image processing apparatus 1 that operates in the high-speed detection mode according to the present exemplary embodiment.

First, in step S107, the image inputting unit 11 receives image data of the next latest frame. Next, in step S108, similar to step S102, the image inputting unit 11 writes the received image data as input image data into the image memory 12.

Next, in step S109, the image zooming unit 13 reads the input image data stored in the image memory 12 and generates m ($n>m\geq 1$) pieces of reduced image data. The image zooming unit 13 writes the generated reduced image data into the image memory 12. The reduction magnification for generating the reduced image data can be determined based on the zooming ratio stored in the detected information storage unit 17.

Alternatively, the detected information storage unit 17 may store image size information instead of the zooming ratio information and can determine a reduction magnification based on the image size information. In the present exemplary embodiment, the zooming ratio of the reduced image from which the predetermined pattern has been detected is the magnification A6. Thus, the detected information storage unit 17 stores the information indicating the magnification A6.

For example, if m=1, the image zooming unit 13 generates a piece of reduced image B1 (=reduced image Bm) data from the input image data using the magnification A6 stored in the detected information storage unit 17. The image zooming unit 13 writes the generated reduced image B1 data into the image memory 12.

Further, if m=3, the image zooming unit 13 generates the reduced image B1 data from the input image data using a magnification A5 that is a zooming ratio comparable to 1.25 times the magnification A6 stored in the detected information storage unit 17. The image zooming unit 13 writes the generated reduced image B1 data into the image memory 12.

Then, the image zooming unit 13 reads the reduced image B1 data from the image memory 12 and generates reduced image B2 data which has a size comparable to 0.8 times the reduced image B1 data in both the horizontal and vertical directions. The image zooming unit 13 writes the second reduced image B2 data into the image memory 12. The zooming ratio in this case is equal to the magnification A6 stored in the detected information storage unit 17.

Subsequently, the image zooming unit 13 reads the reduced image B2 data from the image memory 12 and generates reduced image B3 (=reduced image Bm) data which has a size comparable to 0.8 times the reduced image B2 data in both the horizontal and vertical directions. The image zooming unit 13 writes the generated third reduced image B3 data into the image memory 12. The zooming ratio in this case is equal to the magnification A7.

As described above, if $m\neq 1$, the image zooming unit 13 generates m pieces of reduced image data using a zooming ratio adjacent to the zooming ratio stored in the detected information storage unit 17 among the n pieces of zooming ratios in the generation of n pieces of reduced image data.

Figure 3B:
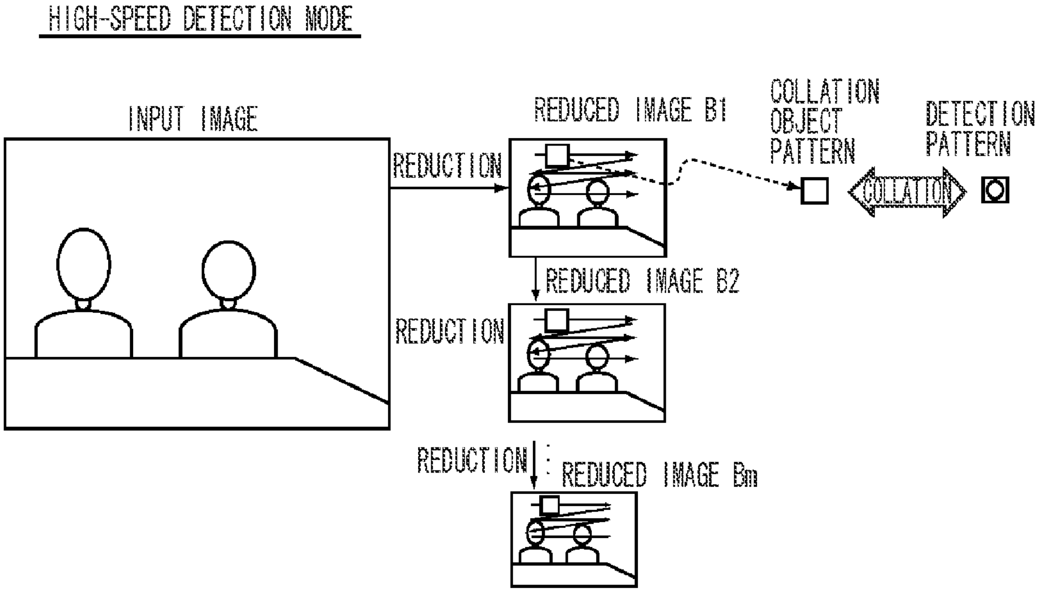

Next, in step S110, the collation object pattern extraction unit 14 moves a rectangular area having a predetermined size on the data of the reduced images B1 to Bm in a direction indicated by an arrow, as illustrated in FIG. 3B, and successively extracts a portion (i.e., a pixel group) included in the rectangular area as a collation object pattern. Then, the portions (i.e., pixel groups) extracted by the collation object pattern extraction unit 14 are output to the pattern detection unit 16.

The pattern detection unit 16 successively performs collation to determine whether each collation object pattern extracted by the collation object pattern extraction unit 14 coincides with the predetermined pattern, referring to the detection pattern stored in the detected pattern storage unit 15.

The processing in step S110 is different from the above-described processing in step S104 in that the total number of the reduced image data is m that is smaller than n.

As described above, in the high-speed detection mode, the image processing apparatus 1 can generate a total of m pieces of reduced image data and perform collation on the generated m pieces of reduced image data.

Next, in step S111, it is determined whether the predetermined pattern has been detected referring to a result of the collation performed on the reduced images B1 to Bm. If it is determined that the predetermined pattern has not been detected (NO in step S111), the image processing apparatus 1 terminates the operation in the high-speed detection mode. Then, the detected information storage unit 17 deletes the stored information indicating the magnification A6. The image processing apparatus 1 starts its operation in the normal detection mode. On the other hand, if it is determined that the predetermined pattern has been detected (YES in step S111), the processing proceeds to step S112.

For example, it is assumed that in step S111 the pattern detection unit 16 has detected the predetermined pattern from the reduced image B3 (=reduced image Bm) that is the third reduced image (m=3). In this case, in step S112, the detected information storage unit 17 deletes the stored information indicating the magnification A6. The detected information storage unit 17 receives information indicating a magnification B3 of the reduced image B3, which is a zooming ratio relative to the input image, from the pattern detection unit 16. The detected information storage unit 17 newly stores the received zooming ratio information. Then, the processing returns to step S107 to execute the processing of steps S107 to S111, similar to the above-described procedure.

In the present exemplary embodiment, the pattern detection unit 16 may have luminance correction processing, density correction processing, and background removal processing functions, which are conventionally known. In this case, the pattern detection unit 16 can perform the luminance correction processing, the density correction processing, and the background removal processing on the collation object patterns. This is effective to improve accuracy of the collation performed by the pattern detection unit 16.

Further, it is useful to separately provide an image processing unit configured to perform the luminance correction processing, the density correction processing, and the background removal processing on the input image or the reduced images. This is also effective to improve the accuracy of the collation performed by the pattern detection unit 16.

Further, in the collation performed by the pattern detection unit 16, it is useful to use only the luminance component of an image. In this case, the image zooming unit 13 can extract only the luminance component and generate reduced image data based on the extracted luminance component.

As described above, if there is no zooming ratio stored in the detected information storage unit 17, the present exemplary embodiment uses a total of n ($n \geq 2$) pieces of reduced images that are sufficient for detecting a predetermined pattern on condition that the size of a predetermined imaging object on the input image is unclear.

For example, when the image inputting unit 11 receives the first frame, it is determined that no zooming ratio is present (stored) in the detected information storage unit 17. On the other hand, if there is any zooming ratio stored in the detected information storage unit 17, the present exemplary embodiment uses m ($n > m \geq 1$) pieces of reduced images to detect the predetermined pattern considering the situation that the size of the predetermined imaging object on the input image is already known.

As described above, the present exemplary embodiment limits the zooming ratio to be used to generate reduced image data referring to the zooming ratio stored in the detected information storage unit 17. Therefore, the present exemplary embodiment can reduce the amount of reduced image data to be generated to detect the predetermined pattern. Therefore, the present exemplary embodiment can reduce a burden in calculation processing by decreasing the processing amount in the zooming processing as well as in the collation. Thus, the present exemplary embodiment can speedily detect the predetermined imaging object.

Further, the present exemplary embodiment can maintain the detection accuracy because of $m > 1$ even when the zooming processing amount is decreased and when the size of predetermined imaging object on the input image is changed. Moreover, the image processing apparatus 1 according to the present exemplary embodiment is configured to receive image data from an external device. However, similar effects can be obtained even in a case where the image processing apparatus 1 is integrated with an imaging apparatus or other image data outputting source.

Figure 4:
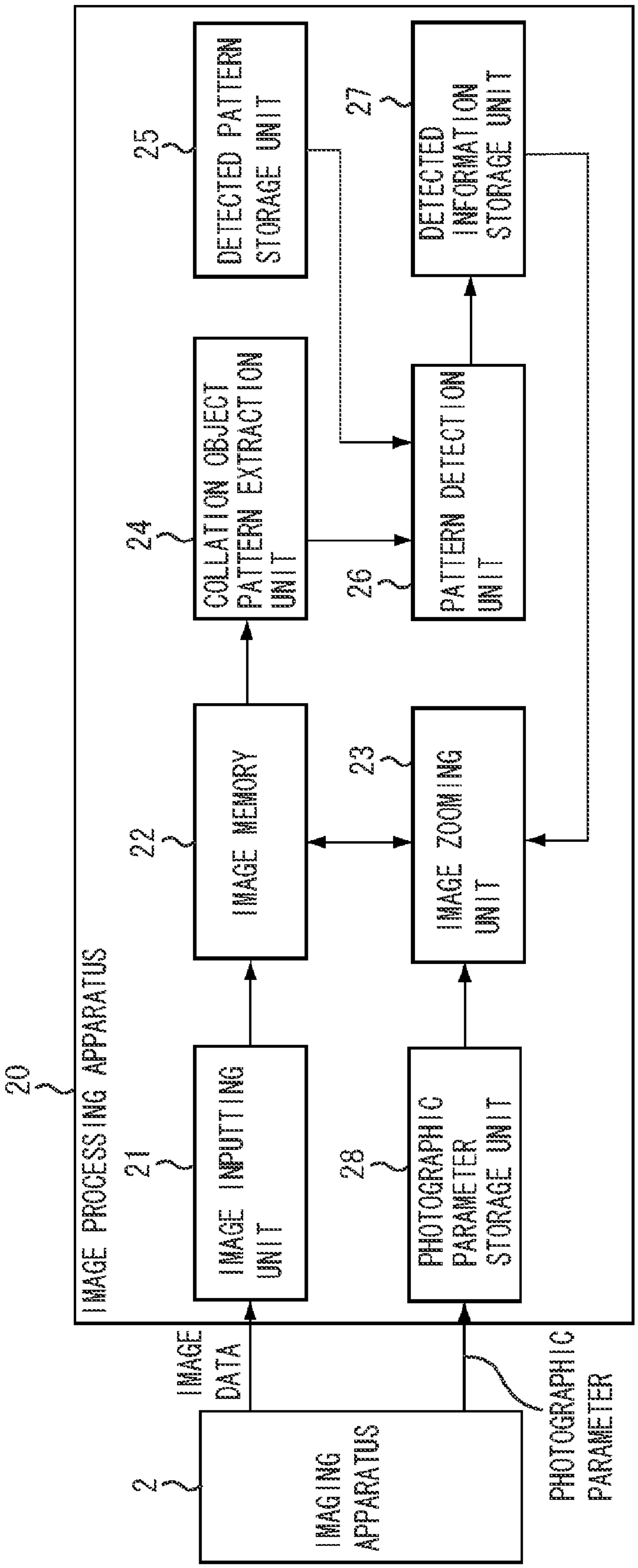
FIG. 4 is a block diagram illustrating an example of the configuration of an image processing apparatus according to a second exemplary embodiment of the present invention.

A second exemplary embodiment is described below. FIG. 4 is a block diagram illustrating an example of the configuration of an image processing apparatus 20 according to the present exemplary embodiment. First, an example of the configuration of the image processing apparatus 20 according to the present exemplary embodiment is described below.

In FIG. 4, an image inputting unit 21 receives image data from an external imaging apparatus 2. Further, the image inputting unit 21 has a decoding processing function for receiving image data that may be conformable to a specific communication method and compatible with a marker code-attached protocol or compression processed image data such as JPEG/MPEG4.

The imaging apparatus 2 is a general camera that includes a charge-coupled device (CCD) or a complementary metal oxide semiconductor (CMOS) configured to receive incident light via a zoom lens that can change a photographic angle of view. The imaging apparatus 2 can generate photographic image data constituted by digital data that are photo-electrically converted by the CCD or CMOS. The imaging apparatus 2 can output photographic parameters including at least a zooming magnification, together with the photographic image data, to the image processing apparatus 20.

A photographic parameter storage unit 28 can receive the photographic parameters output from the imaging apparatus 2 and store the received photographic parameters as parameter information. A general network line, such as a local area network (LAN), or a dedicated cable can be used to transmit or receive various data between the imaging apparatus 2 and the image processing apparatus 20.

An image memory 22 can be configured by a readable and writable storage apparatus (e.g., a RAM). The image memory 22 stores the image data received by the image inputting unit 21 and zooming processed image data supplied from an image zooming unit 23. The image zooming unit 23 can read the image data stored in the image memory 22 and generate reduced image data (i.e., zoomed image data). The image zooming unit 23 can write the reduced image data into the image memory 22.

A collation object pattern extraction unit 24 can move a rectangular area having a predetermined size on the reduced image data stored in the image memory 22 and successively extract and output a portion (i.e., a pixel group) included in the rectangular area as a collation object pattern. In the present exemplary embodiment, an original image can be regarded as an image having a reduced size of 1/1 and can be interpreted as one of the reduced images.

A detected pattern storage unit 25 can store beforehand a detection pattern that represents a predetermined pattern (target object) to be detected from an input image. A pattern detection unit 26 performs collation based on the detection pattern stored in the detected pattern storage unit 25 to determine whether the collation object pattern coincides with the predetermined pattern. A detected information storage unit 27 can receive magnification information relating to a zooming ratio of the reduced image which is used when the predetermined pattern is detected by the pattern detection unit 26. The detected information storage unit 27 stores the magnification information received from the pattern detection unit 26.

Next, an example of processing that can be realized by the functional components illustrated in FIG. 4 is described below with reference to flowcharts illustrated in FIGS. 5A and 5B. The image processing apparatus 20 can provide two types of detection modes (i.e., the normal detection mode and the high-speed detection mode) which can be selected in detection of the predetermined pattern. It is now assumed that the image processing apparatus 20 starts its operation in the normal detection mode.

Figure 5A:
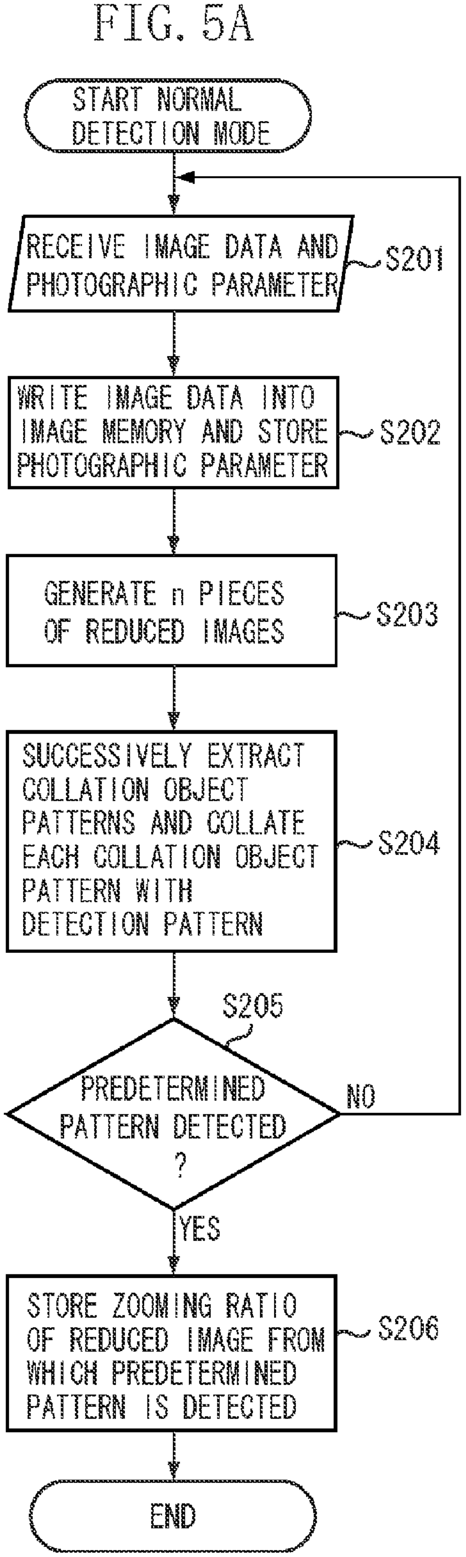
FIGS. 5A and 5B are flowcharts illustrating an example of a processing procedure for detecting a predetermined pattern which can be performed by the image processing apparatus according to the second exemplary embodiment.

FIG. 5A is a flowchart illustrating an example of a processing procedure for detecting a predetermined pattern, which can be performed by the image processing apparatus 20 that operates in the normal detection mode according to the present exemplary embodiment.

First, after starting the processing, in step S201, the image inputting unit 21 receives image data from the imaging apparatus 2. The photographic parameter storage unit 28 receives the photographic parameters relating to the image data received by the image inputting unit 21.

Next, in step S202, the image inputting unit 21 writes the input image data into the image memory 22. In this case, if the received image data is the image data that may be conformable to the specific communication method and compatible with the marker code-attached protocol, the image inputting unit 21 performs marker code removal or similar decoding processing on the received image data. The image inputting unit 21 writes the processing result as input image data into the image memory 22.

Further, if the received image data is the compression processed image data such as JPEG/MPEG4, the image inputting unit 21 performs decompression processing or similar decoding processing on the received image data. The image inputting unit 21 writes the processing result as input image data into the image memory 22.

When the decoding processing is not required, the image inputting unit 21 directly writes the received image data as input image data into the image memory 22. Further, the photographic parameter storage unit 28 stores the received photographic parameters.

Next, in step S203, the image zooming unit 23 reads the input image data stored in the image memory 22 and generates n (n≥2) pieces of reduced image data. The image zooming unit 23 writes the generated reduced image data into the image memory 22.

For example, it is assumed that the input image is of VGA size (640 pixels in the horizontal direction and 480 pixels in the vertical direction). The image zooming unit 23 reduces the input VGA data and generates first reduced image A1 data which has a size of 320 pixels in the horizontal direction and 240 pixels in the vertical direction. The image zooming unit 23 writes the first reduced image A1 data into the image memory 22.

Moreover, the image zooming unit 23 reads the reduced image A1 data from the image memory 22 and generates second reduced image A2 data which has a size comparable to 0.8 times the reduced image A1 data in both the horizontal and vertical directions. The image zooming unit 23 writes the second reduced image A2 data into the image memory 22. The image zooming unit 23 repeats similar reduction processing until n-th reduced image An data can be obtained.

In the present exemplary embodiment, a zooming ratio (i.e., a magnification of an image relative to the input image) in the generation of the reduced image data is a mere example. Further, the value n can be changed considering various conditions, such as the size of the input image or the size of the detection pattern. Alternatively, the value n can be a fixed value. Hereinafter, the zooming ratios for generating the data of the reduced images A1 to An can be referred to as magnifications A1 to An.

Figure 6A:
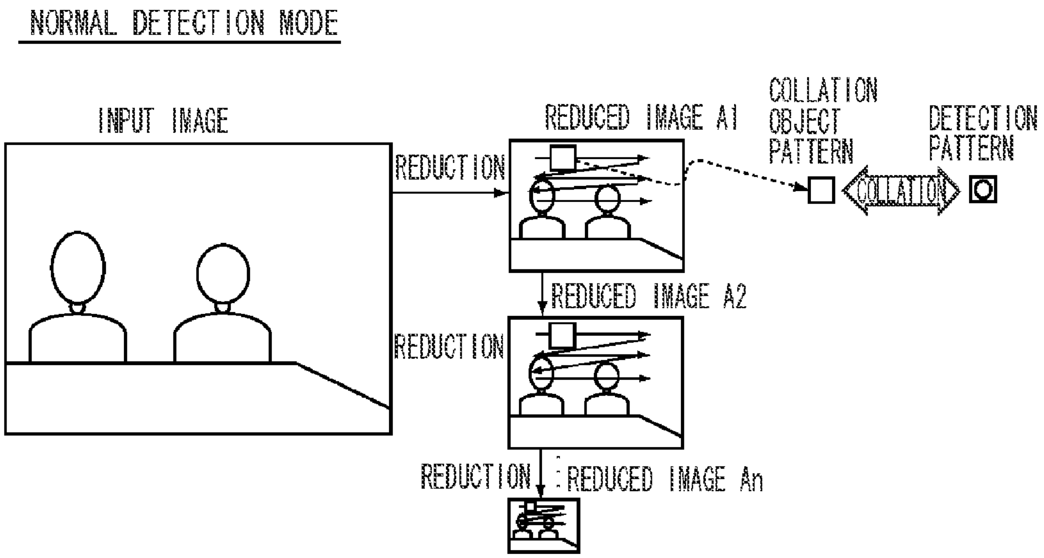
FIGS. 6A and 6B illustrate an example of collating processing to be performed to check whether a collation object pattern coincides with a detection pattern with respect to various reduced images that are different in size according to the second exemplary embodiment.

Next, in step S204, the collation object pattern extraction unit 24 moves a rectangular area having a predetermined size on the data of the reduced images A1 to An in a direction indicated by an arrow, as illustrated in FIG. 6A, and successively extracts a portion (i.e., a pixel group) included in the rectangular area as a collation object pattern. Then, the portions (i.e., pixel groups) extracted by the collation object pattern extraction unit 24 are output to the pattern detection unit 26.

In the present exemplary embodiment, the "predetermined size" can be arbitrarily determined to be a size equal to or greater than the reduced image An, although the rectangular area illustrated in FIG. 6A is similar in size to the detection pattern. The procedure indicated by the arrow is a mere example. The procedure for the successive extraction may be arbitrarily changed.

The pattern detection unit 26 successively performs collation to determine whether each collation object pattern extracted by the collation object pattern extraction unit 24 coincides with the predetermined pattern, referring to the detection pattern stored in the detected pattern storage unit 25. As described above, in the normal detection mode, the image processing apparatus 20 can generate a total of n pieces of reduced image data and perform collation on the generated n pieces of reduced image data.

Next, in step S205, it is determined whether the predetermined pattern is detected based on the result of the collation performed on the reduced images A1 to An. If it is determined that the predetermined pattern is not detected (NO in step S205), the processing returns to step S201 to repeat the processing of steps S201 to S204. On the other hand, if it is determined that the predetermined pattern is detected (YES in step S205), the processing proceeds to step S206.

For example, it is assumed that in step S205 the pattern detection unit 26 has detected the predetermined pattern from the reduced image A6 (i.e., the sixth reduced image). In this case, in step S206, the detected information storage unit 27 receives information indicating a magnification A6 of the reduced image A6, which is a zooming ratio relative to the input image, from the pattern detection unit 26. The detected information storage unit 27 stores the received zooming ratio information. Then, after the zooming ratio information is stored in the detected information storage unit 27, the image processing apparatus 20 terminates the operation in the normal detection mode and shifts its operation mode to the high-speed detection mode.

Figure 5B:
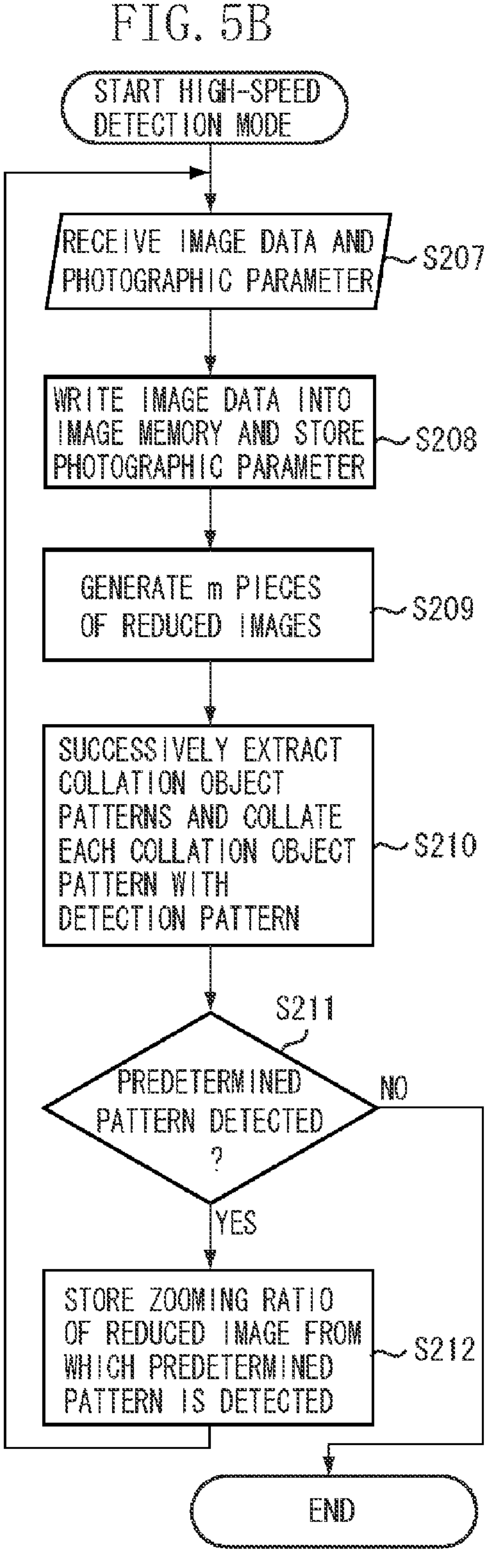

FIG. 5B is a flowchart illustrating an example of a processing procedure for detecting a predetermined pattern, that can be performed by the image processing apparatus 20 that operates in the high-speed detection mode according to the present exemplary embodiment.

First, in step S207, the image inputting unit 21 receives image data of the next latest frame from the imaging apparatus 2. The photographic parameter storage unit 28 receives photographic parameters relating to the image data received by the image inputting unit 21. Next, in step S208, similar to step S202, the image inputting unit 21 writes the received image data as input image data into the image memory 22.

Moreover, the photographic parameter storage unit 28 stores the photographic parameters of the latest frame so as to be added to the photographic parameters of a preceding frame.

Next, in step S209, the image zooming unit 23 reads the input image data stored in the image memory 22 and generates m ($n>m\geq 1$) pieces of reduced image data. The image zooming unit 23 writes the generated reduced image data into the image memory 22. The reduction magnification for generating the reduced image data can be determined based on the zooming ratio stored in the detected information storage unit 27 and the photographic parameters (including the zooming magnification of the imaging apparatus 2) stored in the photographic parameter storage unit 28. In the present exemplary embodiment, the zooming ratio of the reduced image from which the predetermined pattern has been detected is the magnification A6. Thus, the detected information storage unit 27 stores the information indicating the magnification A6.

First, as an example, an operation in the case of m=1 is described below. It is assumed that the magnification A6 stored in the detected information storage unit 27 is 0.4, the zooming magnification of the preceding frame is 2, and the zooming magnification of the latest frame is 5. In this case, a zooming ratio A6' for generating the reduced image of the latest frame can be obtained according to the following formula.

$$\begin{aligned} A6' &= A6 \times (\text{zooming magnification of preceding frame}) \div \\ &\quad (\text{zooming magnification of latest frame}) \\ &= 0.4 \times 2 \div 5 \\ &= 0.16 \end{aligned}$$

The image zooming unit 23 generates a piece of reduced image B1 (=reduced image Bm) data from the input image data using the magnification A6' and writes the generated reduced image B1 data into the image memory 22. If the magnifications that can be processed by the image zooming unit 23 are limited to fixed values, the image zooming unit 23 can use a value adjacent to the magnification A6'.

Next, an operation in the case of m=3 is described below. It is assumed that the magnification A6 stored in the detected information storage unit 27 is 0.4, the zooming magnification of the preceding frame is 2, and the zooming magnification of the latest frame is 5. First, the image zooming unit 23 obtains the magnification A6' according to a procedure similar to the above-described procedure in the case of m=1. Then, the image zooming unit 23 generates the reduced image B1 data from the input image data using a zooming ratio comparable to 1.25 times the magnification A6'.

The image zooming unit 23 writes the generated reduced image B1 data into the image memory 22. Next, the image zooming unit 23 reads the reduced image B1 data from the image memory 22 and generates reduced image B2 data which has a size comparable to 0.8 times the reduced image B1 data in both the horizontal and vertical directions. The image zooming unit 23 writes the second reduced image B2 data into the image memory 22. The zooming ratio in this case is equal to the magnification A6'.

Subsequently, the image zooming unit 23 reads the reduced image B2 data from the image memory 22 and generates reduced image B3 (=reduced image Bm) data which has a size comparable to 0.8 times the reduced image B2 data in both the horizontal and vertical directions. The image zooming unit 23 writes the generated reduced image B3 into the image memory 22.

As described above, if $m\neq 1$, the image zooming unit 23 generates m pieces of reduced image data using a zooming ratio adjacent to the zooming ratio that can be determined based on the zooming ratio stored in the detected information storage unit 27 and the photographic parameters stored in the photographic parameter storage unit 28.

Figure 6B:
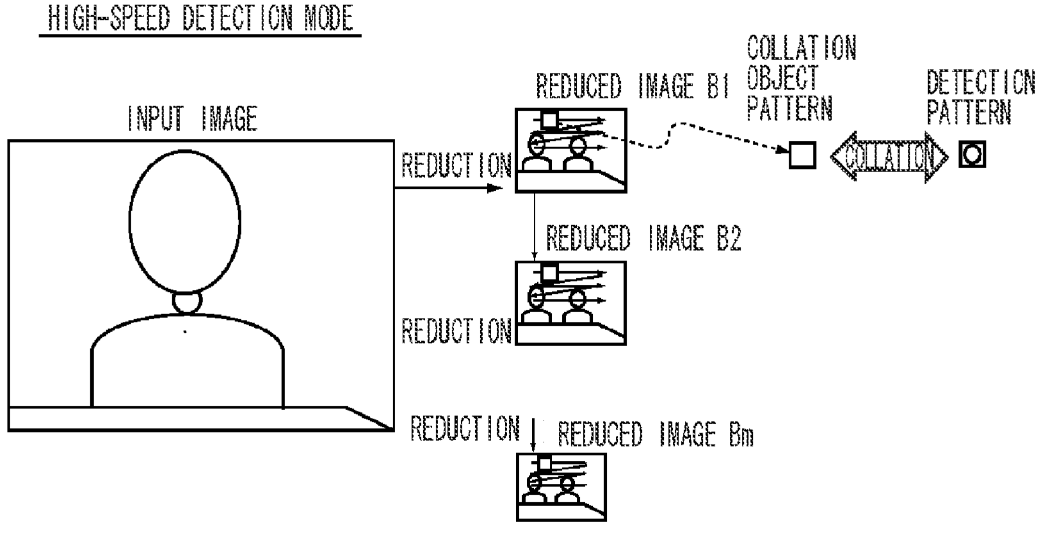

Next, in step S210, the collation object pattern extraction unit 24 moves a rectangular area having a predetermined size on the data of the reduced images B1 to Bm in a direction indicated by an arrow, as illustrated in FIG. 6B, and successively extracts a portion (i.e., a pixel group) included in the rectangular area as a collation object pattern. Then, the portions (i.e., pixel groups) extracted by the collation object pattern extraction unit 24 are output to the pattern detection unit 26.

The pattern detection unit 26 successively performs collation to determine whether each collation object pattern extracted by the collation object pattern extraction unit 24 coincides with the predetermined pattern, referring to the detection pattern stored in the detected pattern storage unit 25.

The processing in step S210 is different from the above-described processing in step S204 in that the total number of the reduced image data is m that is smaller than n.

As described above, in the high-speed detection mode, the image processing apparatus 20 can generate a total of m pieces of reduced image data and perform collation on the generated m pieces of reduced image data.

Next, in step S211, it is determined whether the predetermined pattern has been detected referring to a result of the collation performed on the reduced images B1 to Bm. If it is determined that the predetermined pattern has not been detected (NO in step S211), the image processing apparatus 20 terminates the operation in the high-speed detection mode. Then, the detected information storage unit 27 deletes the stored information indicating the magnification A6. The image processing apparatus 20 starts its operation in the normal detection mode. On the other hand, if it is determined that the predetermined pattern has been detected (YES in step S211), the processing proceeds to step S212.

For example, it is assumed that in step S211 the pattern detection unit 26 has detected the predetermined pattern from the reduced image B3 (=reduced image Bm) that is the third reduced image (m=3). In this case, in step S212, the detected information storage unit 27 deletes the stored information indicating the magnification A6. The detected information storage unit 27 receives information indicating a magnification B3 of the reduced image B3, which is a zooming ratio relative to the input image, from the pattern detection unit 26. The detected information storage unit 27 newly stores the received zooming ratio information. Then, the processing returns to step S207 to execute the processing of steps S207 to S211, similar to the above-described procedure.

In the present exemplary embodiment, the photographic parameter storage unit 28 stores two photographic parameters. However, the photographic parameter storage unit 28 can store a change amount between two photographic parameters. For example, if the zooming magnification of the preceding frame is 2 and the zooming magnification of the latest frame is 5, the photographic parameter storage unit 28 can store 2.5 as a change amount. In this case, the zooming ratio for generating the reduced image of the latest frame can be calculated according to the following formula.

Zooming ratio=(stored zooming ratio)÷(change amount)

In the present exemplary embodiment, the pattern detection unit 26 may have luminance correction processing, density correction processing, and background removal processing functions, which are conventionally known. In this case, the pattern detection unit 26 can perform the luminance correction processing, the density correction processing, and the background removal processing on the collation object patterns. This is effective to improve the accuracy of the collation performed by the pattern detection unit 26.

Further, it is useful to separately provide an image processing unit configured to perform the luminance correction processing, the density correction processing, and the background removal processing on the input image or the reduced images. This is also effective to improve the accuracy of the collation performed by the pattern detection unit 26.

Further, in the collation performed by the pattern detection unit 26, it is useful to use only the luminance component of an image. In this case, the image zooming unit 23 can extract only the luminance component and generate reduced image data based on the extracted luminance component.

As described above, if there is no zooming ratio stored in the detected information storage unit 27, the present exemplary embodiment uses a total of n ($n \geq 2$) pieces of reduced images that are sufficient for detecting a predetermined pattern on condition that the size of a predetermined imaging object on the input image is unclear.

For example, when the image inputting unit 21 receives the first frame, it is determined that no zooming ratio is present (stored) in the detected information storage unit 17. On the other hand, if there is any zooming ratio stored in the detected information storage unit 27, the present exemplary embodiment uses m ($n > m \geq 1$) pieces of reduced images to detect the predetermined pattern considering the situation that the size of the predetermined imaging object on the input image is already known.

In this case, the present exemplary embodiment limits the zooming ratio to be used to generate reduced image data referring to the zooming ratio stored in the detected information storage unit 27 and the photographic parameter (i.e., the zooming magnification) stored in the photographic parameter storage unit 28. Therefore, the present exemplary embodiment can reduce the amount of reduced image data to be generated to detect the predetermined pattern even in a case where the size of the imaging object on the input image is changed by a zooming operation of the imaging apparatus 2.

Moreover, the present exemplary embodiment can reduce the burden in calculation processing by decreasing the processing amount in the zooming processing as well as in the collation. Thus, the present exemplary embodiment can speedily detect the predetermined imaging object.

Further, the present exemplary embodiment can maintain the detection accuracy because of $m > 1$ even when the zooming processing amount is decreased and when the size of predetermined imaging object on the input image is changed due to change in a distance between the imaging object and the imaging apparatus. The image processing apparatus 20 according to the present exemplary embodiment is connected to the imaging apparatus 2 via a general network line or a dedicated cable. However, similar effects can be obtained even in a case where the image processing apparatus 20 is integrated with the imaging apparatus 2.

Figure 7:
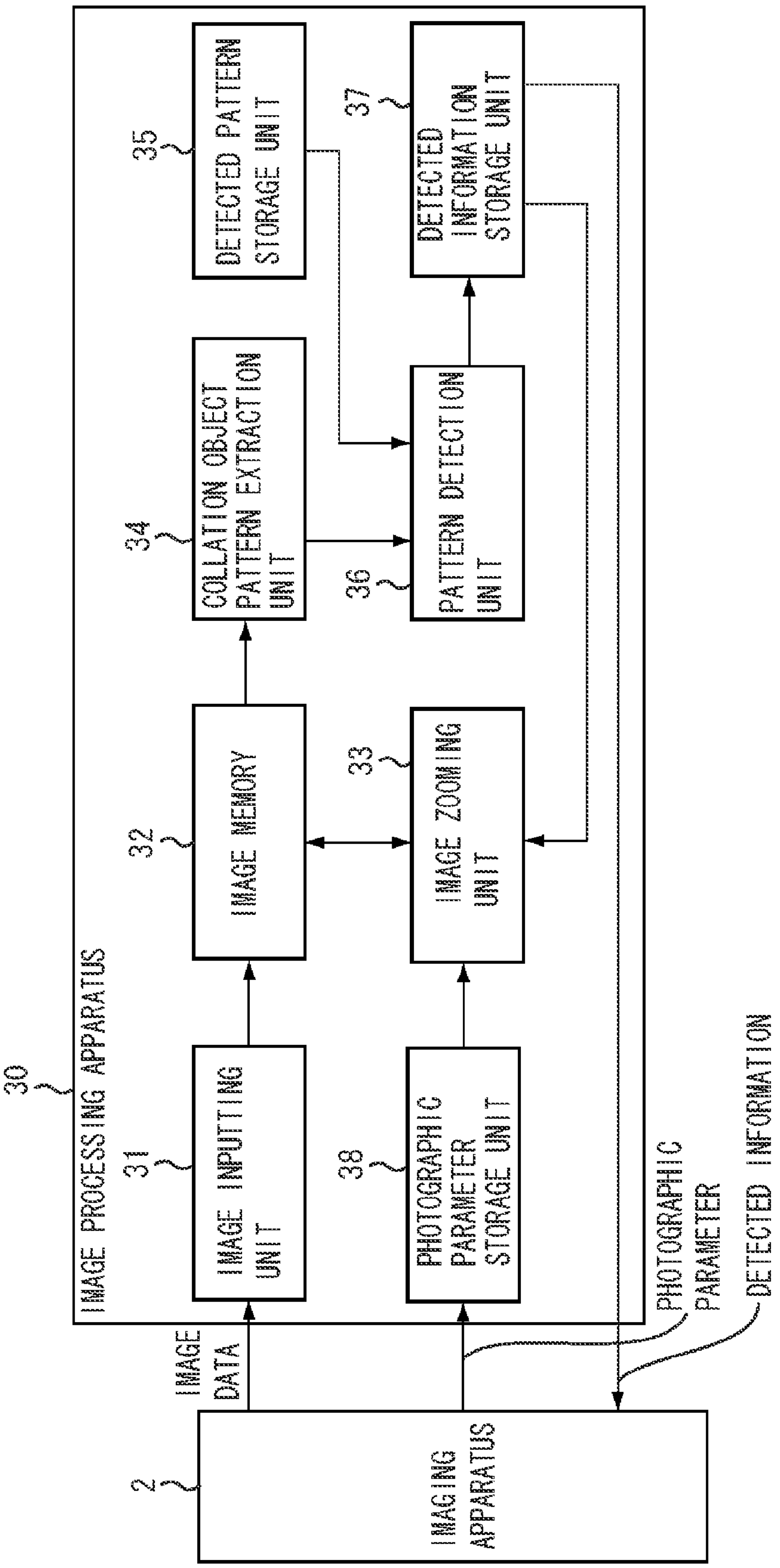
FIG. 7 is a block diagram illustrating an example of the configuration of an image processing apparatus according to a third exemplary embodiment of the present invention.

A third exemplary embodiment is described below. FIG. 7 is a block diagram illustrating an example of the configuration of an image processing apparatus 30 according to the present exemplary embodiment. First, an example of the configuration of the image processing apparatus 30 according to the present exemplary embodiment is described below.

In FIG. 7, an image inputting unit 31 can receive image data from the external imaging apparatus 2. Further, the image inputting unit 31 has a decoding processing function for receiving image data that may be conformable to a specific communication method and compatible with a marker code-attached protocol or compression processed image data such as JPEG/MPEG4.

The imaging apparatus 2 is a general camera that includes a CCD or a CMOS configured to receive incident light via a zoom lens that can change a photographic angle of view. The imaging apparatus 2 can generate photographic image data constituted by digital data that are photo-electrically converted by the CCD or CMOS.

The imaging apparatus 2 can output photographic parameters including at least a zooming magnification, together with the photographic image data, to the image processing apparatus 30. A photographic parameter storage unit 38 can receive the photographic parameters output from the imaging apparatus 2 and store the received photographic parameters as parameter information. A general network line, such as LAN, or a dedicated cable can be used to transmit or receive various data between the imaging apparatus 2 and the image processing apparatus 30.

An image memory 32 can be configured by a readable and writable storage apparatus (e.g., a RAM). The image memory 22 stores the image data received by the image inputting unit 31 and zooming processed image data supplied from an image zooming unit 33. The image zooming unit 33 can read the image data stored in the image memory 32 and generate reduced image data (i.e., zoomed image data). The image zooming unit 33 can write the reduced image data into the image memory 32.

A collation object pattern extraction unit 34 can move a rectangular area having a predetermined size on the reduced image data stored in the image memory 32 and successively extract and output a portion (i.e., a pixel group) included in the rectangular area as a collation object pattern. In the present exemplary embodiment, an original image can be regarded as an image having a reduced size of 1/1 and can be interpreted as one of the reduced images.

A detected pattern storage unit 35 can store beforehand a detection pattern that represents a predetermined pattern (target object) to be detected from an input image. A pattern detection unit 36 performs collation based on the detection pattern stored in the detected pattern storage unit 35 to determine whether the collation object pattern coincides with the predetermined pattern.

A detected information storage unit 37 can receive magnification information relating to a zooming ratio of the reduced image and position information of the collation object pattern which are used when the predetermined pattern is detected by the pattern detection unit 36. The detected information storage unit 37 stores the magnification information and the position information received from the pattern detection unit 36. Moreover, the detected information storage unit 37 transmits the position information of the collation object pattern to the imaging apparatus 2.

Next, an example of processing that can be realized by the functional components illustrated in FIG. 7 is described below with reference to flowcharts illustrated in FIGS. 8A and 8B. The image processing apparatus 30 can provide two types of detection modes (i.e., the normal detection mode and the high-speed detection mode) which can be selected in detection of the predetermined pattern. It is now assumed that the image processing apparatus 30 starts its operation in the normal detection mode.

Figure 8A:
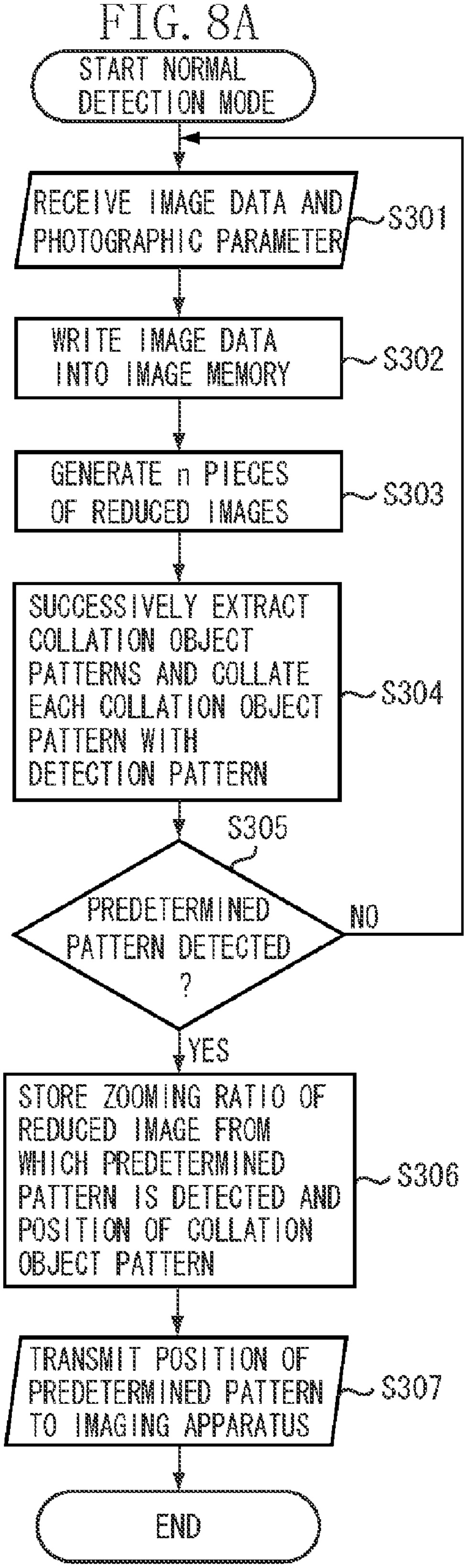
FIGS. 8A and 8B are flowcharts illustrating an example of a processing procedure for detecting a predetermined pattern which can be performed by the image processing apparatus according to the third exemplary embodiment.

FIG. 8A is a flowchart illustrating an example of a processing procedure for detecting a predetermined pattern, which can be performed by the image processing apparatus 30 that operates in the normal detection mode according to the present exemplary embodiment.

After starting the processing, first, in step S301, the image inputting unit 31 receives image data from the imaging apparatus 2. The photographic parameter storage unit 38 receives the photographic parameters relating to image data received by the image inputting unit 31.

Next, in step S302, the image inputting unit 31 writes the input image data into the image memory 32. In this case, if the received image data is the image data that may be conformable to the specific communication method and compatible with the marker code-attached protocol, the image inputting unit 31 performs marker code removal or similar decoding processing on the received image data. The image inputting unit 31 writes the processing result as input image data into the image memory 32.

Further, if the received image data is the compression processed image data such as JPEG/MPEG4, the image inputting unit 31 performs decompression processing or similar decoding processing on the received image data. The image inputting unit 31 writes the processing result as input image data into the image memory 32.

When the decoding processing is not required, the image inputting unit 31 directly writes the received image data as input image data into the image memory 32. Further, the photographic parameter storage unit 38 stores the received photographic parameters.

Next, in step S303, the image zooming unit 33 reads the input image data stored in the image memory 32 and generates n (n≥2) pieces of reduced image data. The image zooming unit 33 writes the generated reduced image data into the image memory 32.

For example, it is assumed that the input image is of VGA size (640 pixels in the horizontal direction and 480 pixels in the vertical direction). The image zooming unit 33 reduces the input VGA data and generates first reduced image A1 data which has a size of 320 pixels in the horizontal direction and 240 pixels in the vertical direction. The image zooming unit 33 writes the first reduced image A1 data into the image memory 32.

Moreover, the image zooming unit 33 reads the reduced image A1 data from the image memory 32 and generates second reduced image A2 data which has a size comparable to 0.8 times the reduced image A1 data in both the horizontal and vertical directions. The image zooming unit 33 writes the second reduced image A2 data into the image memory 32. The image zooming unit 33 repeats similar reduction processing until n-th reduced image An data can be obtained.

In the present exemplary embodiment, a zooming ratio (i.e., a magnification of an image relative to the input image) in the generation of the reduced image data is a mere example. Further, the value n can be changed considering various conditions, such as the size of the input image or the size of the detection pattern. Alternatively, the value n can be a fixed value. Hereinafter, the zooming ratios for generating the data of the reduced images A1 to An can be referred to as magnifications A1 to An.

Next, in step S304, the collation object pattern extraction unit 34 moves a rectangular area having a predetermined size on the data of the reduced images A1 to An in a direction indicated by an arrow, as illustrated in FIG. 6A, and successively extracts a portion (i.e., a pixel group) included in the rectangular area as a collation object pattern. Then, the portions (i.e., pixel groups) extracted by the collation object pattern extraction unit 34 are output to the pattern detection unit 36.

In the present exemplary embodiment, the "predetermined size" can be arbitrarily determined to be a size equal to or greater than the reduced image An, although the rectangular area illustrated in FIG. 6A is similar in size to the detection pattern. The procedure indicated by the arrow is a mere example. The procedure for the successive extraction may be arbitrarily changed.

Moreover, the pattern detection unit 36 successively performs collation to determine whether each collation object pattern extracted by the collation object pattern extraction unit 34 coincides with the predetermined pattern, referring to the detection pattern stored in the detected pattern storage unit 35. As described above, in the normal detection mode, the image processing apparatus 30 can generate a total of n pieces of reduced image data and perform collation on the generated n pieces of reduced image data.

Next, in step S305, it is determined whether the predetermined pattern is detected based on the result of the collation performed on the reduced images A1 to An. If it is determined that the predetermined pattern is not detected (NO in step S505), the processing returns to step S301 to repeat the processing of steps S301 to S304. On the other hand, if it is determined that the predetermined pattern is detected (YES in step S305), the processing proceeds to step S306.

For example, it is assumed that in step S305 the pattern detection unit 36 has detected the predetermined pattern from the reduced image A6 (i.e., the sixth reduced image). In this case, in step S306, the detected information storage unit 37 receives information indicating a magnification A6 of the reduced image A6, which is a zooming ratio relative to the input image, and position information of the collation object pattern from the pattern detection unit 36. The detected information storage unit 37 stores the zooming ratio information and the position information received from the pattern detection unit 36.

Next, in step S307, the detected information storage unit 37 calculates a position of the predetermined pattern on the input image based on the position of the collation object pattern in the reduced image A6 and the magnification A6. The detected information storage unit 37 transmits the calculation result as detection information to the imaging apparatus 2. Then, after the zooming ratio information is stored in the detected information storage unit 37 and the detection information is transmitted to the imaging apparatus 2, the image processing apparatus 30 terminates the operation in the normal detection mode and shifts its operation mode to the high-speed detection mode.

Figure 8B:
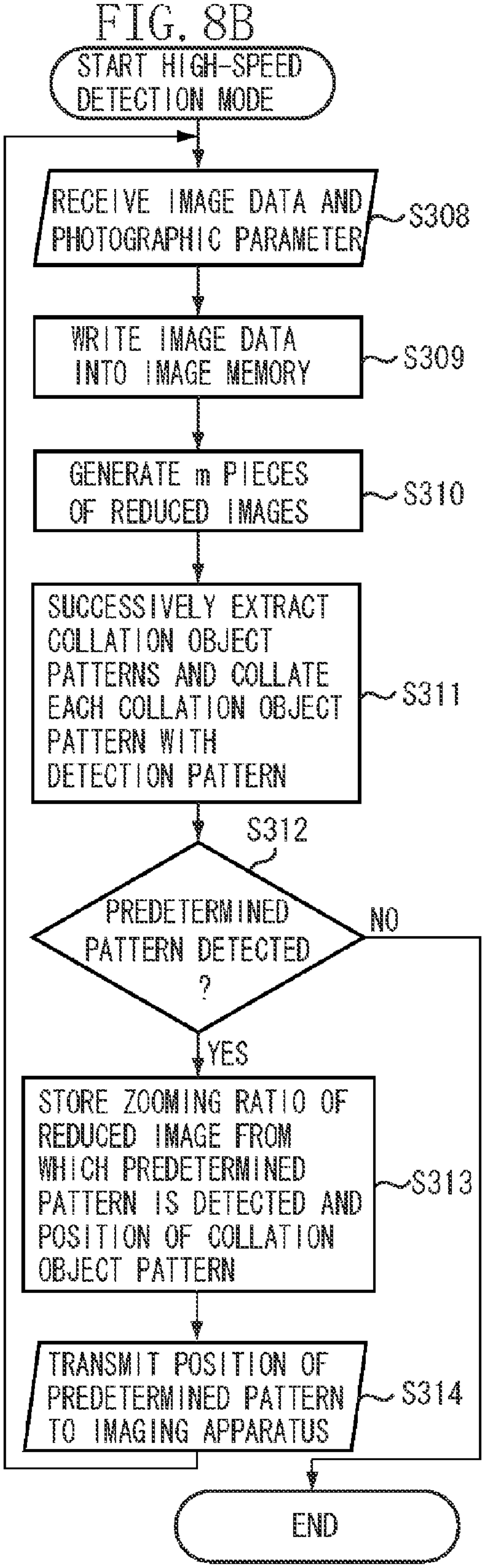

FIG. 8B is a flowchart illustrating an example of a processing procedure for detecting a predetermined pattern, which can be performed by the image processing apparatus 30 that operates in the high-speed detection mode according to the present exemplary embodiment.

First, in step S308, the image inputting unit 31 receives image data of the next latest frame from the imaging apparatus 2. The photographic parameter storage unit 38 receives photographic parameters relating to the image data received by the image inputting unit 31. Next, in step S309, similar to step S302, the image inputting unit 31 writes the received image data as input image data into the image memory 32. The photographic parameter storage unit 38 stores the photographic parameters of the latest frame so as to be added to the photographic parameters of a preceding frame.

Next, in step S310, the image zooming unit 33 reads the input image data stored in the image memory 32 and generates m ($n>m\geq 1$) pieces of reduced image data. The image zooming unit 33 writes the generated reduced image data into the image memory 32. The reduction magnification for generating the reduced image data can be determined based on the zooming ratio stored in the detected information storage unit 37 and the photographic parameters (including the zooming magnification of the imaging apparatus 2) stored in the photographic parameter storage unit 38.

In the present exemplary embodiment, the zooming ratio of the reduced image from which the predetermined pattern has been detected is the magnification A6. Thus, the detected information storage unit 37 stores the information indicating the magnification A6.

First, as an example, an operation in the case of m=1 is described below. It is assumed that the magnification A6 stored in the detected information storage unit 37 is 0.4, the zooming magnification of the preceding frame is 2, the zooming magnification of the latest frame is 5. In this case, a zooming ratio A6' for generating the reduced image of the latest frame can be obtained according to the following formula.

$$\begin{aligned} A6' &= A6 \times (\text{zooming magnification of preceding frame}) \div \\ &\quad (\text{zooming magnification of latest frame}) \\ &= 0.4 \times 2 \div 5 \\ &= 0.16 \end{aligned}$$

The image zooming unit 33 generates a piece of reduced image B1 (=reduced image Bm) data from the input image data using the magnification A6' and writes the generated reduced image B1 into the image memory 32. If the magnifications that can be processed by the image zooming unit 33 are limited to fixed values, the image zooming unit 33 can use a value adjacent to the magnification A6'.

Next, an operation in the case of m=3 is described below. It is assumed that the magnification A6 stored in the detected information storage unit 37 is 0.4, the zooming magnification of the preceding frame is 2, and the zooming magnification of the latest frame is 5. First, the image zooming unit 33 obtains the magnification A6' according to a procedure similar to the above-described procedure in the case of m=1.

Then, the image zooming unit 33 generates reduced image B1 data from the input image data using a zooming ratio comparable to 1.25 times the magnification A6'. The image zooming unit 33 writes the generated reduced image B1 data into the image memory 32. Next, the image zooming unit 33 reads the reduced image B1 data from the image memory 32 and generates reduced image B2 data which has a size comparable to 0.8 times the reduced image B1 data in both the horizontal and vertical directions. The image zooming unit 33 writes the second reduced image B2 data into the image memory 32. The zooming ratio in this case is equal to the magnification A6'.

Subsequently, the image zooming unit 33 reads the reduced image B2 data from the image memory 32 and generates reduced image B3 (=reduced image Bm) data which has a size comparable to 0.8 times the reduced image B2 data in both the horizontal and vertical directions. The image zooming unit 33 writes the generated reduced image B3 into the image memory 32.

As described above, if $m\neq 1$, the image zooming unit 33 generates m pieces of reduced image data using a zooming ratio adjacent to the zooming ratio that can be determined based on the zooming ratio stored in the detected information storage unit 37 and the photographic parameters stored in the photographic parameter storage unit 38.

Next, in step S311, the collation object pattern extraction unit 34 moves a rectangular area having a predetermined size on the data of the reduced images B1 to Bm in a direction indicated by an arrow, as illustrated in FIG. 6B, and successively extracts a portion (i.e., a pixel group) included in the rectangular area as a collation object pattern. Then, the portions (i.e., pixel groups) extracted by the collation object pattern extraction unit 34 are output to the pattern detection unit 36.

The pattern detection unit 36 successively performs collation to determine whether each collation object pattern extracted by the collation object pattern extraction unit 34 coincides with the predetermined pattern, referring to the detection pattern stored in the detected pattern storage unit 35.

The processing in step S311 is different from the above-described processing in step S304 in that the total number of the reduced image data is m that is smaller than n.

As described above, in the high-speed detection mode, the image processing apparatus 30 can generate a total of m pieces of reduced image data and perform collation on the generated m pieces of reduced image data.

Next, in step S312, it is determined whether the predetermined pattern has been detected referring to a result of the collation performed on the reduced images B1 to Bm. If it is determined that the predetermined pattern has not been detected (NO in step S312), the image processing apparatus 30 terminates the operation in the high-speed detection mode. Then, the detected information storage unit 37 deletes the stored information indicating the magnification A6. The image processing apparatus 30 starts its operation in the normal detection mode. On the other hand, if it is determined that the predetermined pattern has been detected (YES in step S312), the processing proceeds to step S313.

For example, it is assumed that in step S312 the pattern detection unit 36 has detected the predetermined pattern from the reduced image B3 (=reduced image Bm) that is the third reduced image (m=3). In this case, in step S313, the detected information storage unit 37 deletes the stored information indicating the magnification A6 and the position information of the collation object pattern. Then, the detected information storage unit 37 receives information indicating a magnification B3 of the reduced image B3, which is a zooming ratio relative to the input image, and position information of the collation object pattern from the pattern detection unit 36. The detected information storage unit 37 newly stores the received zooming ratio information and the position information.

Next, in step S314, the detected information storage unit 37 calculates the position of the predetermined pattern on the input image based on the position of the collation object pattern in the reduced image B3 and the magnification B3. The detected information storage unit 37 transmits the calculation result as detection information to the imaging apparatus 2. Then, the processing returns to step S308 to execute the processing of steps S308 to S312 as described above.

In the present exemplary embodiment, the photographic parameter storage unit 38 stores two photographic parameters. However, the photographic parameter storage unit 38 can store a change amount between two photographic parameters. For example, if the zooming magnification of the preceding frame is 2 and the zooming magnification of the latest frame is 5, the photographic parameter storage unit 38 can store 2.5 as a change amount. In this case, the zooming ratio for generating the reduced image of the latest frame can be calculated according to the following formula.

Zooming ratio=(stored zooming ratio)÷(change amount)

In the present exemplary embodiment, the pattern detection unit 36 may have luminance correction processing, density correction processing, and background removal processing functions, which are conventionally known. In this case, the pattern detection unit 36 can perform the luminance correction processing, the density correction processing, and the background removal processing on the collation object patterns. This is effective to improve the accuracy of the collation performed by the pattern detection unit 36.

Further, it is useful to separately provide an image processing unit configured to perform the luminance correction processing, the density correction processing, and the background removal processing on the input image or the reduced images. This is also effective to improve the accuracy of the collation performed by the pattern detection unit 36.

Further, in the collation performed by the pattern detection unit 36, it is useful to use only the luminance component of an image. In this case, the image zooming unit 33 can extract only the luminance component and generate reduced image data based on the extracted luminance component.

As described above, if there is no zooming ratio stored in the detected information storage unit 37, the present exemplary embodiment uses a total of n ($n \geq 2$) pieces of reduced images that are sufficient for detecting a detection pattern stored in the detected pattern storage unit 35 on condition that the size of a predetermined imaging object on the input image is unclear.

For example, when the image inputting unit 31 receives the first frame, it is determined that no zooming ratio is present (stored) in the detected information storage unit 37. On the other hand, if there is any zooming ratio stored in the detected information storage unit 37, the present exemplary embodiment uses m ($n > m \geq 1$) pieces of reduced images to detect the predetermined pattern considering the situation that the size of the predetermined imaging object on the input image is already known.

In this case, the present exemplary embodiment limits the zooming ratio to be used to generate reduced image data referring to the zooming ratio stored in the detected information storage unit 37 and the photographic parameter (i.e., the zooming magnification) stored in the photographic parameter storage unit 38. Therefore, the present exemplary embodiment can reduce the amount of reduced image data to be generated to detect the predetermined pattern even in a case where the size of the imaging object on the input image is changed by a zooming operation of the imaging apparatus 2.

Moreover, the present exemplary embodiment can reduce the burden in calculation processing by decreasing the processing amount in the zooming processing as well as in the collation. Thus, the present exemplary embodiment can speedily detect the predetermined imaging object.

Further, the present exemplary embodiment can maintain the detection accuracy because of $m > 1$ even when the zooming processing amount is decreased and when the size of predetermined imaging object on the input image is changed due to change in a distance between the imaging object and the imaging apparatus.

Further, the present exemplary embodiment can detect a predetermined imaging object and can transmit position information of a predetermined pattern on the input image (i.e., the captured image) as detection information to the imaging apparatus 2. Thus, the present exemplary embodiment enables the imaging apparatus 2 to perform tracking operation of the predetermined imaging object.

In the present exemplary embodiment, the imaging apparatus 2 can perform the tracking operation to continuously capture the predetermined pattern in the imaging field by using a panning mechanism, a tilting mechanism, a zoom mechanism, or various functions including image segmenting processing that are provided thereto.

In the tracking operation, if the predetermined imaging object is zoomed up, the angle of view becomes narrower. Further, if the image processing apparatus 30 operates in the normal detection mode, a relatively long time is required to detect the imaging object. The imaging object may exit from the frame.

However, the present exemplary embodiment starts the tracking operation after the predetermined pattern is first detected. Thus, the present exemplary embodiment can transmit detection information of the predetermined pattern obtained in the high-speed detection mode. The imaging apparatus 2 can constantly capture the predetermined pattern in the imaging field.

Moreover, the image processing apparatus 30 according to the present exemplary embodiment is connected to the imaging apparatus 2 via a general network line or a dedicated cable. However, similar effects can be obtained even in a case where the image processing apparatus 30 is integrated with the imaging apparatus 2.

Further, as described in the first exemplary embodiment, even in a case where the image processing apparatus has no photographic parameter storage unit, the image processing apparatus can transmit the position information of the predetermined pattern to a transmission destination if the transmission destination of the input image data can be identified.

Figure 9:
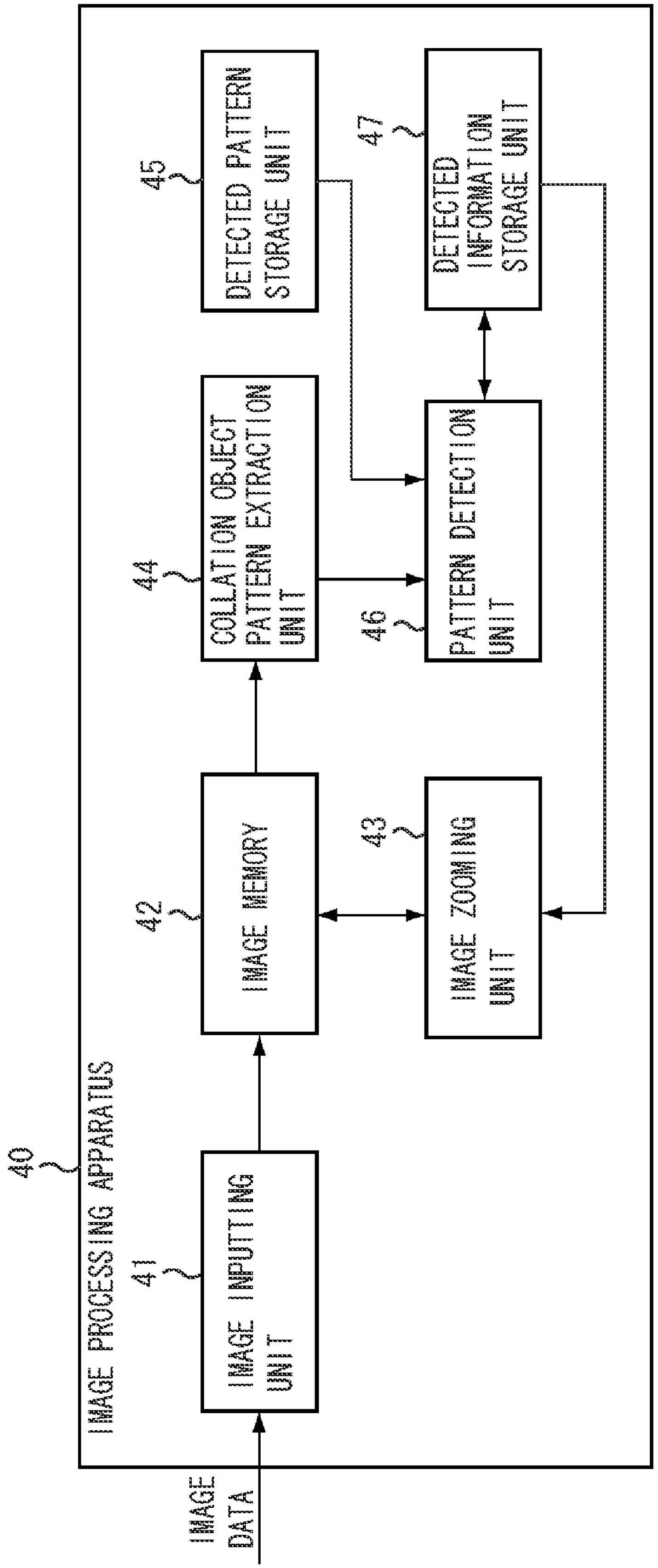
FIG. 9 is a block diagram illustrating an example of the configuration of an image processing apparatus according to a fourth exemplary embodiment of the present invention.

A fourth exemplary embodiment is described below. FIG. 9 is a block diagram illustrating an example of the configuration of an image processing apparatus 40 according to the present exemplary embodiment. First, an example of the configuration of the image processing apparatus 40 according to the present exemplary embodiment is described below.

In FIG. 9, an image inputting unit 41 receives image data. Further, the image inputting unit 41 has a decoding processing function for receiving image data that may be conformable to a specific communication method and compatible with a marker code-attached protocol or compression processed image data such as JPEG/MPEG4. In the present exemplary embodiment, the image data include photographic image data captured and generated by an imaging apparatus and image data stored in an external storage apparatus. An output source is not limited to a specific device.

An image memory 42 can be configured by a readable and writable storage apparatus (e.g., a RAM). The image memory 42 stores the image data received by the image inputting unit 41 and zooming processed image data supplied from an image zooming unit 43. The image zooming unit 43 can read the image data stored in the image memory 42 and generate reduced image data (i.e., zoomed image data). The image zooming unit 43 can write the reduced image data into the image memory 42.

A collation object pattern extraction unit 44 can move a rectangular area having a predetermined size on the reduced image data stored in the image memory 42 and successively extract and output a portion (i.e., a pixel group) included in the rectangular area as a collation object pattern. In the present exemplary embodiment, an original image can be regarded as an image having a reduced size of 1/1 and can be interpreted as one of the reduced images.

A detected pattern storage unit 45 can store beforehand a detection pattern that represents a predetermined pattern (target object) to be detected from an input image. A pattern detection unit 46 performs collation based on the detection pattern stored in the detected pattern storage unit 45 to determine whether the collation object pattern coincides with the predetermined pattern. Moreover, the pattern detection unit 46 obtains YUV values for respective pixels that can be converted from the pixels obtained from the detected predetermined pattern.

A detected information storage unit 47 can receive magnification information relating to a zooming ratio of the reduced image and color information which are used when the predetermined pattern is detected by the pattern detection unit 46. The detected information storage unit 47 stores the magnification information and the color information received from the pattern detection unit 46.

Next, an example of processing that can be realized by the functional components illustrated in FIG. 9 is described below with reference to flowcharts illustrated in FIGS. 10A and 10B. The image processing apparatus 40 can provide two types of detection modes (i.e., the normal detection mode and the high-speed detection mode) which can be selected in detection of the predetermined pattern. It is now assumed that the image processing apparatus 40 starts its operation in the normal detection mode.

Figures 10A, 10B:
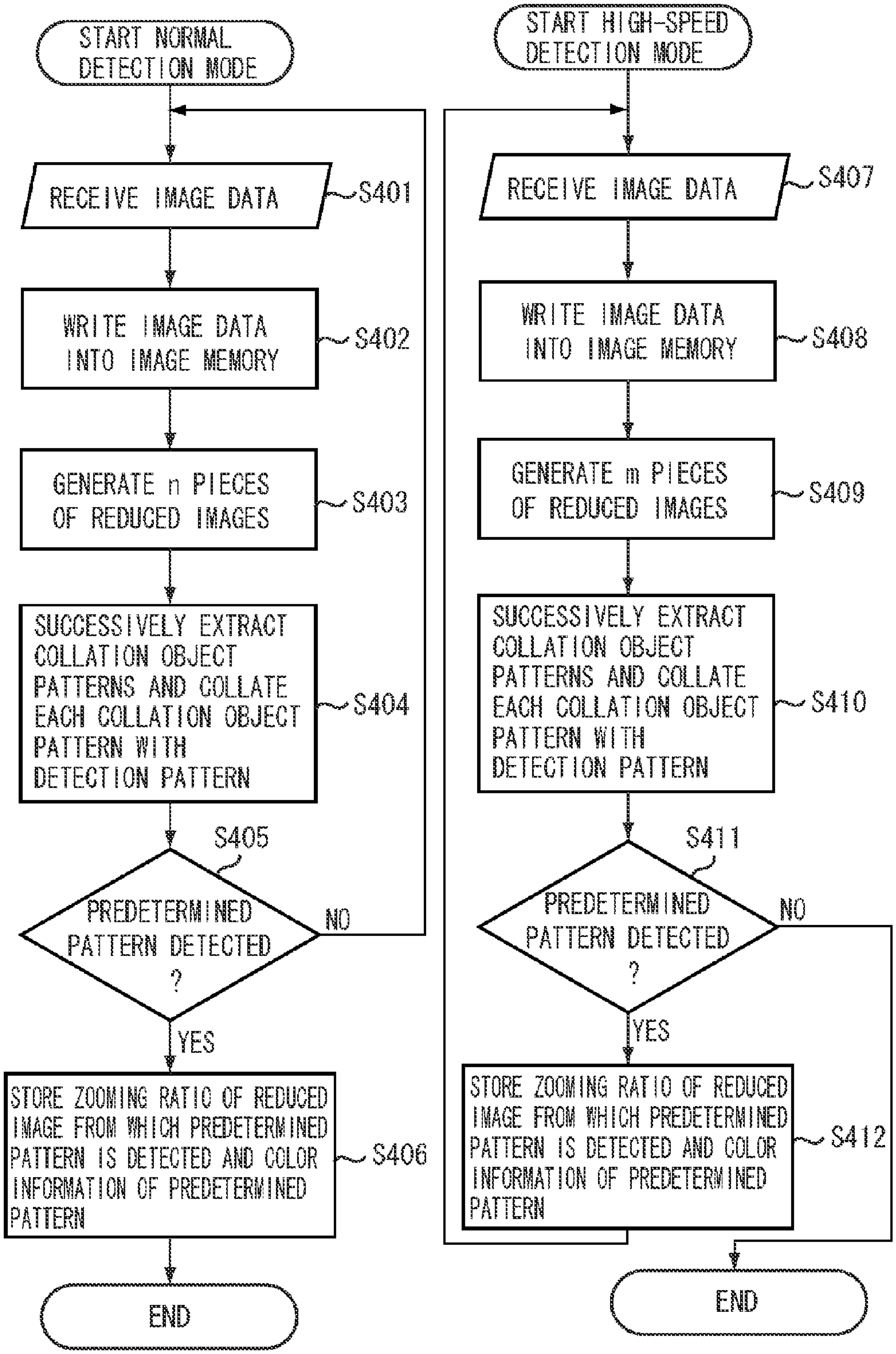
FIGS. 10A and 10B are flowcharts illustrating an example of a processing procedure for detecting a predetermined pattern which can be performed by image processing apparatus according to the fourth exemplary embodiment.

FIG. 10A is a flowchart illustrating an example of a processing procedure for detecting a predetermined pattern, which can be performed by the image processing apparatus 40 that operates in the normal detection mode according to the present exemplary embodiment.

After starting the processing, first in step S401, the image inputting unit 41 receives image data. In this case, if the received image data is the image data that may be conformable to the specific communication method and compatible with the marker code-attached protocol or the compression processed image data such as JPEG/MPEG4, the image inputting unit 41 performs decoding processing on the received image data.

Next, in step S402, the image inputting unit 41 writes the processing result as input image data into the image memory 42. When the decoding processing is not required, the image inputting unit 41 directly writes the received image data as input image data into the image memory 42.

Next, in step S403, the image zooming unit 43 reads the input image data stored in the image memory 42 and generates n ($n \geq 2$) pieces of reduced image data. The image zooming unit 43 writes the generated reduced image data into the image memory 42.

For example, it is assumed that the input image is of the VGA size (640 pixels in the horizontal direction and 480 pixels in the vertical direction). The image zooming unit 43 reduces the input VGA data and generates first reduced image A1 data which has a size of 320 pixels in the horizontal direction and 240 pixels in the vertical direction. The image zooming unit 43 writes the first reduced image A1 data into the image memory 42.

Moreover, the image zooming unit 43 reads the reduced image A1 data from the image memory 42 and generates a second reduced image A2 data which has a size comparable to 0.8 times the reduced image A1 data in both the horizontal and vertical directions. The image zooming unit 43 writes the second reduced image A2 data into the image memory 42. The image zooming unit 43 repeats similar reduction processing until n-th reduced image An data can be obtained.

In the present exemplary embodiment, a zooming ratio (i.e., a magnification of an image relative to the input image) in the generation of the reduced image data is a mere example. Further, the value n can be changed considering various conditions, such as the size of the input image or the size of the detection pattern. Alternatively, the value n can be a fixed value. Hereinafter, the zooming ratios for generating the data of the reduced images A1 to An can be referred to as magnifications A1 to An.

Next, in step S404, the collation object pattern extraction unit 44 moves a rectangular area having a predetermined size on the data of the reduced images A1 to An in a direction indicated by an arrow, as illustrated in FIG. 3A, and successively extracts a portion (i.e., a pixel group) included in the rectangular area as a collation object pattern. Then, the portions (i.e., pixel groups) extracted by the collation object pattern extraction unit 44 are output to the pattern detection unit 46.

In the present exemplary embodiment, the "predetermined size" can be arbitrarily determined to be a size equal to or greater than the reduced image An, although the rectangular area illustrated in FIG. 3A is similar in size to the detection pattern. The procedure indicated by the arrow is a mere example. The procedure for the successive extraction may be arbitrarily changed.

The pattern detection unit 46 successively performs collation to determine whether each collation object pattern extracted by the collation object pattern extraction unit 44 coincides with the predetermined pattern, referring to the detection pattern stored in the detected pattern storage unit 45.

As described above, in the normal detection mode, the image processing apparatus 40 can generate a total of n pieces of reduced image data and perform collation on the generated n pieces of reduced image data.

Next, in step S405, it is determined whether the predetermined pattern is detected based on the result of the collation performed on the reduced images A1 to An. If it is determined that the predetermined pattern is not detected (NO in step S405), the processing returns to step S401 to repeat the processing of steps S401 to S404. On the other hand, if it is determined that the predetermined pattern is detected (YES in step S405), the processing proceeds to step S406.

For example, it is assumed that in step S405 the pattern detection unit 46 has detected the predetermined pattern from the reduced image A6 (i.e., the sixth reduced image). In this case, in step S406, the detected information storage unit 47 receives information indicating a magnification A6 of the reduced image A6 which is a zooming ratio relative to the input image, from the pattern detection unit 46. The detected information storage unit 47 stores the received zooming ratio information.

Moreover, the pattern detection unit 46 obtains YUV values for respective pixels that can be converted from the pixels obtained from the detected predetermined pattern. Then, the detected information storage unit 47 receives, from the pattern detection unit 46, color information including upper and lower limits of U and V values that represent color-difference information. The detected information storage unit 47 stores the received color information.

Then, after the zooming ratio information and the color information are stored in the detected information storage unit 47, the image processing apparatus 40 terminates the operation in the normal detection mode and shifts its operation mode to the high-speed detection mode.

FIG. 10B is a flowchart illustrating an example of a processing procedure for detecting a predetermined pattern, which can be performed by the image processing apparatus 40 that operates in the high-speed detection mode according to the present exemplary embodiment.

First, in step S407, the image inputting unit 41 receives image data of the next latest frame. Next, in step S408, similar to step S402, the image inputting unit 41 writes the received image data as input image data into the image memory 42.

Next, in step S409, the image zooming unit 43 reads the input image data stored in the image memory 42 and generates m (n>m≥1) pieces of reduced image data. The image zooming unit 43 writes the generated reduced image data into the image memory 42.

The reduction magnification for generating the reduced image data can be determined based on the zooming ratio stored in the detected information storage unit 47. Alternatively, the detected information storage unit 47 may store image size information instead of the zooming ratio information and can determine a reduction magnification based on the image size information.

In the present exemplary embodiment, the zooming ratio of the reduced image from which the predetermined pattern has been detected is the magnification A6. Thus, the detected information storage unit 47 stores the information indicating the magnification A6.

For example, if m=1, the image zooming unit 43 generates a piece of reduced image B1 (=reduced image Bm) data from the input image data using the magnification A6 stored in the detected information storage unit 47. The image zooming unit 43 writes the generated reduced image B1 data into the image memory 42.

Further, if m=3, the image zooming unit 43 generates the reduced image B1 data from the input image data using a magnification A5 that is a zooming ratio comparable to 1.25 times the magnification A6 stored in the detected information storage unit 47. The image zooming unit 43 writes the generated reduced image B1 data into the image memory 42.

Then, the image zooming unit 43 reads the reduced image B1 data from the image memory 42 and generates reduced image B2 data which has a size comparable to 0.8 times the reduced image B1 data in both the horizontal and vertical directions. The image zooming unit 43 writes the second reduced image B2 data into the image memory 42. The zooming ratio in this case is equal to the magnification A6 stored in the detected information storage unit 47.

Subsequently, the image zooming unit 43 reads the reduced image B2 data from the image memory 42 and generates reduced image B3 (=reduced image Bm) data which has a size comparable to 0.8 times the reduced image B2 data in both the horizontal and vertical directions. The image zooming unit 43 writes the generated third reduced image B3 data into the image memory 42. The zooming ratio in this case is equal to the magnification A7.

As described above, if m≠1, the image zooming unit 43 generates m pieces of reduced image data using a zooming ratio adjacent to the zooming ratio stored in the detected information storage unit 47 among the n pieces of zooming ratios in the generation of n pieces of reduced image data.

Next, in step S410, the collation object pattern extraction unit 44 moves a rectangular area having a predetermined size on the data of the reduced images B1 to Bm in a direction indicated by an arrow, as illustrated in FIG. 3B, and successively extracts a portion (i.e., a pixel group) included in the rectangular area as a collation object pattern. Then, the portions (i.e., pixel groups) extracted by the collation object pattern extraction unit 44 are output to the pattern detection unit 46. Then, the pattern detection unit 46 successively performs the following processing on the collation object pattern.

First, the pattern detection unit 46 detects, from a target collation object pattern, pixels included in a range between the upper and lower limits of the U and V values of the color information stored in the detected information storage unit 47.

If a ratio of the pixels included in the range between the upper and lower limits of the U and V values is less than a predetermined value, the pattern detection unit 46 does not perform collation between the target collation object pattern and the detection pattern stored in the detected pattern storage unit 45.

Then, only when the ratio of the pixels included in the range between the upper and lower limits of the U and V values is equal to or greater than the predetermined value, the pattern detection unit 46 performs collation to determine whether the collation object pattern coincides with the detection pattern stored in the detected pattern storage unit 45. The processing in step S410 is different from the above-described processing in step S404 in that the total number of the reduced image data is m that is smaller than n.

As described above, in the high-speed detection mode, the image processing apparatus 40 can generate a total of m pieces of reduced image data and perform collation on the generated m pieces of reduced image data.

Next, in step S411, it is determined whether the predetermined pattern has been detected referring to a result of the collation performed on the reduced images B1 to Bm. If it is determined that the predetermined pattern has not been detected (NO in step S411), the image processing apparatus 40 terminates the operation in the high-speed detection mode.

Then, the detected information storage unit 47 deletes the stored information indicating the magnification A6 and the color information. The image processing apparatus 40 starts its operation in the normal detection mode. On the other hand, if it is determined that the predetermined pattern has been detected (YES in step S411), the processing proceeds to step S412.

For example, it is assumed that in step S411 the pattern detection unit 46 has detected the predetermined pattern from the reduced image B3 (=reduced image Bm) that is the third reduced image (m=3). In this case, in step S412, the detected information storage unit 47 deletes the stored information indicating the magnification A6 and the color information.

Then, the detected information storage unit 47 receives, from the pattern detection unit 46, information indicating a magnification B3 of the reduced image B3, which is a zooming ratio relative to the input image, and color information including upper and lower limits of U and V values that can be obtained from the detected predetermined pattern. The detected information storage unit 47 newly stores the received zooming ratio information and the color information. Then, the processing returns to step S407 to execute the processing of steps S407 to S411, similar to the above-described procedure.

In the present exemplary embodiment, the detected information storage unit 47 stores the color information including the upper and lower limits of the U and V values obtained from the detected predetermined pattern. Alternatively, the detected information storage unit 47 can store color information (e.g., luminance and RGB values) and can limit collation object patterns to be compared with the detection pattern.

In the present exemplary embodiment, the pattern detection unit 46 may have luminance correction processing, density correction processing, and background removal processing functions, which are conventionally known. In this case, the pattern detection unit 46 can perform the luminance correction processing, the density correction processing, and the background removal processing on the collation object patterns. This is effective to improve the accuracy of the collation performed by the pattern detection unit 46.

Further, it is useful to separately provide an image processing unit configured to perform the luminance correction processing, the density correction processing, and the background removal processing on the input image or the reduced images. This is also effective to improve the accuracy of the collation performed by the pattern detection unit 46.

Further, in the collation performed by the pattern detection unit 46, it is useful to use only the luminance component of an image. In this case, the image zooming unit 43 can extract only the luminance component and generate reduced image data based on the extracted luminance component.

As described above, similar to the first exemplary embodiment, the present exemplary embodiment limits the zooming ratio to be used to generate reduced image data referring to the zooming ratio stored in the detected information storage unit 47. Therefore, the present exemplary embodiment can reduce the amount of reduced image data to be generated to detect the predetermined pattern. Therefore, the present exemplary embodiment can reduce the burden in calculation processing by decreasing the processing amount in the zooming processing as well as in the collation. Thus, the present exemplary embodiment can speedily detect the predetermined imaging object.

Moreover, in the present exemplary embodiment, the detected information storage unit 47 stores color information including upper and lower limits of U and V values obtained from the detected predetermined pattern. Then, the present exemplary embodiment performs collation to check whether the collation object pattern coincides with the detection pattern stored in the detected pattern storage unit 45 only when the ratio of the pixels of the collation object pattern in the range between the upper and lower limits of the U and V values is equal to or greater than a predetermined value. Thus, the present exemplary embodiment can further reduce the number of collations. Therefore, the present exemplary embodiment can reduce the burden in calculation processing and can speedily detect the predetermined imaging object.

Further, the present exemplary embodiment can maintain the detection accuracy because of $m>1$ even when the zooming processing amount is decreased and when the size of predetermined imaging object on the input image is changed according to the distance between the imaging object and the imaging apparatus.

Moreover, the image processing apparatus 40 according to the present exemplary embodiment is configured to receive image data from an external device. However, similar effects can be obtained even in a case where the image processing apparatus 40 is integrated with an imaging apparatus or other image data outputting source. The image processing apparatus 40 according to the present exemplary embodiment can be combined with the image processing apparatus described in the second or third exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-258452, filed Oct. 3, 2008, which is hereby incorporated by reference herein in its entirety.

What is claimed is:

1. An image processing apparatus that can detect a predetermined target object from image data, the image processing apparatus comprising:

an image inputting unit configured to input the image data;

an image zooming unit configured to generate a plurality of pieces of zoomed image data that are mutually different in magnification from the image data input by the image inputting unit;

a detection unit configured to detect the predetermined target object by determining whether a partial area in the plurality of pieces of zoomed image data coincides with a predetermined detection pattern; and a detected information storage unit configured to store detection information including magnification information of the zoomed image data from which the predetermined target object is detected by the detection unit, wherein, in a case where the detection unit detects the predetermined target object from first zoomed image data generated from first image data, the image zooming unit determines a magnification of second zoomed image data generated from second image data based on the magnification information of the first zoomed image data and generates at least one piece of the second zoomed image data whose total number is smaller compared to a case where the detection unit does not detect the predetermined target object from the first zoomed image data.

2. The image processing apparatus according to claim 1, wherein in the case where the detection unit detects the predetermined target object from the first zoomed image data, the image zooming unit generates at least one piece of the second zoomed image data which has a magnification similar to the magnification included in the detection information.

3. The image processing apparatus according to claim 1, wherein in the case where the detection unit detects the predetermined target object from the first zoomed image data, the image zooming unit generates a plurality of pieces of the second zoomed image data which have mutually different magnifications so that the magnification contained in the detection information can be included as a central value.

4. The image processing apparatus according to claim 1, further comprising a parameter storage unit configured to store parameter information of the image data input by the image inputting unit, wherein, in the case where the detection unit detects the predetermined target object from the first zoomed image data, the image zooming unit determines the magnification of the second zoomed image data based on the detection information and the parameter information stored in the parameter storage unit and generates at least one piece of the second zoomed image data whose total number is smaller compared to the case where the detection unit does not detect the predetermined target object from the first zoomed image data.

5. The image processing apparatus according to claim 4, wherein in the case where the detection unit detects the predetermined target object from the first zoomed image data, the image zooming unit generates at least one piece of the second zoomed image data calculated based on the magnification included in the detection information and a magnification included in the parameter information stored in the parameter storage unit.

6. The image processing apparatus according to claim 4, wherein in the case where the detection unit detects the predetermined target object from the first zoomed image data, the image zooming unit generates a plurality of pieces of the second zoomed image data which have mutually different magnifications so that the magnification calculated based on the magnification included in the detection information and the magnification included in the parameter information stored in the parameter storage unit can be included as a central value.

7. The image processing apparatus according to claim 4, wherein the parameter information stored in the parameter storage unit includes information indicating a zooming magnification of an imaging apparatus that has generated the first image data input by the image inputting unit.

8. The image processing apparatus according to claim 1, wherein the detection information stored in the detected information storage unit further includes position information of the predetermined target object in the zoomed image data from which the predetermined target object is detected, and the image processing apparatus further comprises a transmission unit configured to transmit the position information to an imaging apparatus that has generated the input image data.

9. The image processing apparatus according to claim 1, further comprising a deletion unit configured to delete the detection information stored in the detected information storage unit in a case where the predetermined target object is not detected by the detection unit.

10. The image processing apparatus according to claim 1, wherein the detection information stored in the detected information storage unit further includes color information of the predetermined target object, and the detection unit uses the color information to narrow down a collation target area.

11. The image processing apparatus according to claim 1, further comprising a zooming ratio input unit configured to input a zooming ratio for capturing an image to generate the image data to be inputted from the image inputting unit, wherein the image zooming unit determines the magnification of the second zoomed image data based on the magnification information of the first zoomed image data, a first zooming ratio for capturing the image to generate the first image data, and a second zooming ratio for capturing the image to generate the second image data.

12. A method performed in an imaging processing apparatus for processing an image which detects a predetermined target object from image data, wherein the imaging processing apparatus includes an image inputting unit, image zooming unit, detection unit and storage detection unit, the method comprising:

via the image inputting unit, inputting the image data;

via the image zooming unit, generating a plurality of pieces of zoomed image data that are mutually different in magnification from the input image data;

via the detection unit, detecting the predetermined target object by determining whether a partial area in the plurality of pieces of zoomed image data coincides with a detection pattern representing the predetermined target object; and via the storage detection unit, storing detection information including magnification information of the zoomed image data from which the predetermined target object is detected in a storage unit, wherein in the generation of a second zoomed image data, in a case where the predetermined target object is detected from first zoomed image data generated from first image data, the method further comprises determining a magnification of the second zoomed image data generated from second image data based on the magnification information of the first zoomed image data and generating the second zoomed image data whose total number is smaller compared to a case where the predetermined target object is not detected from the first zoomed image data.

13. A non-transitory computer-readable storage medium that stores a program for instructing a computer to implement the method for image processing according to claim 12.

14. The computer-readable storage medium according to claim 13, further comprising inputting a zooming ratio for capturing an image to generate the image data to be inputted from the image inputting unit, wherein the magnification of the second zoomed image data is determined based on the magnification information of the first zoomed image data, a first zooming ratio for capturing the image to generate the first image data, and a second zooming ratio for capturing the image to generate the second image data.

15. The method according to claim 12, further comprising inputting a zooming ratio for capturing an image to generate the image data to be inputted from the image inputting unit, wherein the magnification of the second zoomed image data is determined based on the magnification information of the first zoomed image data, a first zooming ratio for capturing the image to generate the first image data, and a second zooming ratio for capturing the image to generate the second image data.

* * * * *